(12) United States Patent
Elliott et al.

(10) Patent No.: US 7,896,419 B2
(45) Date of Patent: Mar. 1, 2011

(54) SIDE MOUNTED TAILGATE STEP

(75) Inventors: Adrian Nicholas Alexander Elliott, Dearborn, MI (US); Jason Falenski, Berkley, MI (US); William Boberg, Monroe, MI (US)

(73) Assignees: Ford Global Technologies, LLC, Dearborn, MI (US); Midway Products Group, Inc., Monroe, MI (US)

( * ) Notice: Subject to any disclaimer, the term of this patent is extended or adjusted under 35 U.S.C. 154(b) by 249 days.

(21) Appl. No.: 12/210,341

(22) Filed: Sep. 15, 2008

(65) Prior Publication Data
US 2009/0072571 A1 Mar. 19, 2009

Related U.S. Application Data

(60) Provisional application No. 60/972,559, filed on Sep. 14, 2007, provisional application No. 60/972,916, filed on Sep. 17, 2007.

(51) Int. Cl.
*B62D 25/00* (2006.01)
(52) U.S. Cl. .......................................... 296/62; 280/166
(58) Field of Classification Search .................. 296/62; 280/166
See application file for complete search history.

(56) References Cited

U.S. PATENT DOCUMENTS

| 4,191,388 | A | 3/1980 | Barksdale |
| 4,639,032 | A | 1/1987 | Barbour |
| 6,170,843 | B1 | 1/2001 | Maxwell et al. |
| 6,422,342 | B1 | 7/2002 | Armstrong et al. |
| 6,857,680 | B2 | 2/2005 | Fielding |
| 6,905,158 | B1 | 6/2005 | Bastian |
| 6,918,624 | B2 | 7/2005 | Miller et al. |
| 7,059,648 | B2 | 6/2006 | Livingston |
| 7,261,357 | B1 | 8/2007 | Bechen |
| 7,264,253 | B1 | 9/2007 | Cummings |
| 7,673,922 | B1 * | 3/2010 | Grimes ........................ 296/62 |

* cited by examiner

*Primary Examiner*—Joseph D Pape
(74) *Attorney, Agent, or Firm*—Gregory P. Brown; Price, Heneveld, Cooper, DeWitt & Litton, LLP

(57) ABSTRACT

A vehicle tailgate side mounted step assist mechanism attachable to a vehicle including a vehicle bed coupled to a pillar and a tailgate pivotally attached to the vehicle bed for providing access to the vehicle bed in a tailgate open position and securing contents of the vehicle bed in a tailgate closed position. The mechanism may include generally parallel supports rotatably mountable to a side of the tailgate, the supports capable of being deployed when the tailgate is in the tailgate open position and stowed when the tailgate is in the tailgate closed position. A tailgate step is disposable between the supports at a predetermined distance from the side of the tailgate, and a lockout device prevents the tailgate from returning to the tailgate closed position when the tailgate step is deployed.

19 Claims, 22 Drawing Sheets

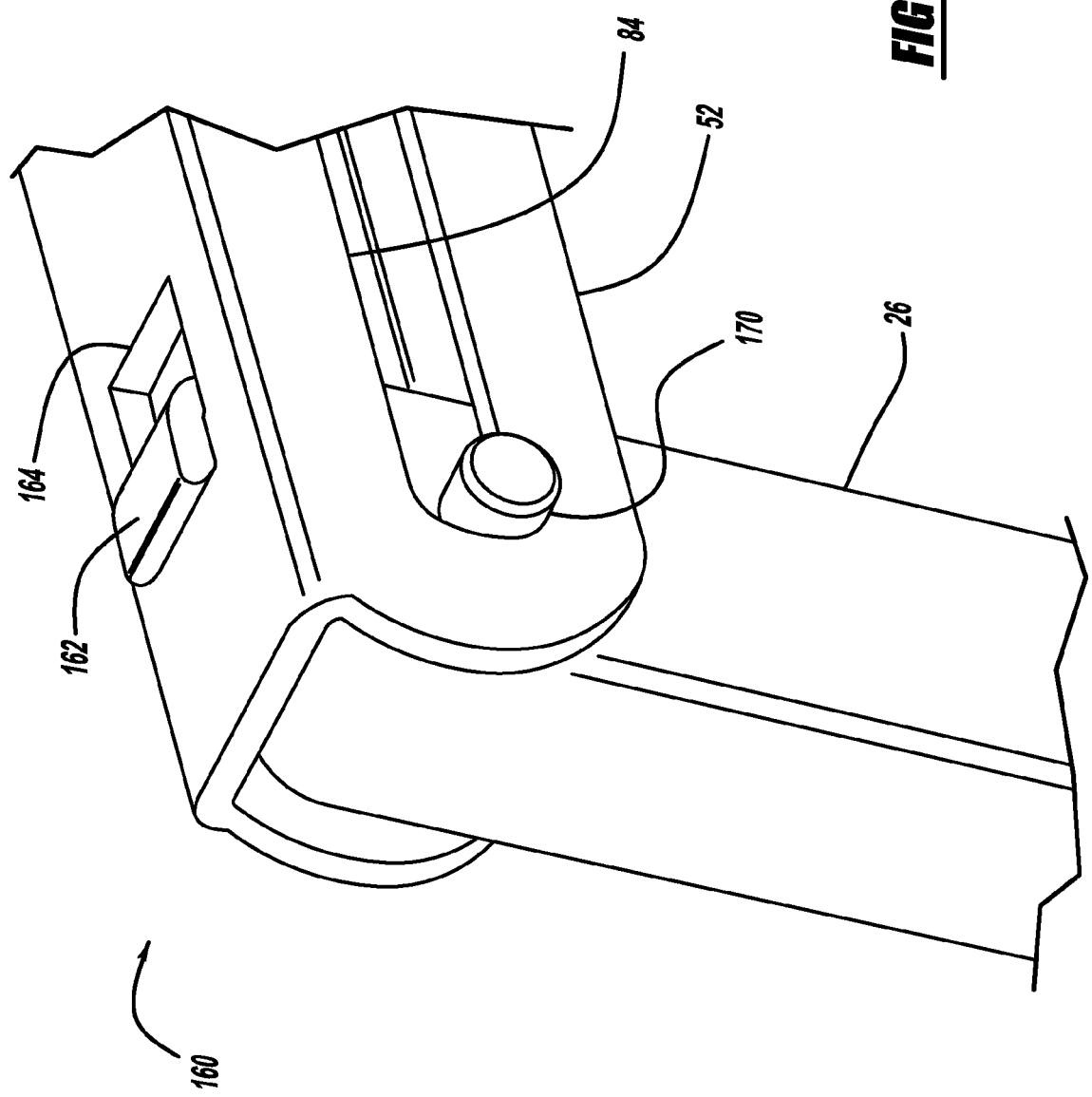

SIDE MOUNTED TAILGATE STEP

RELATED APPLICATIONS

This application claims benefit of priority of Provisional Application Ser. Nos. 60/972,559 filed Sep. 14, 2007 and 60/972,916 filed Sep. 17, 2007, hereby incorporated by reference in their entirety.

BACKGROUND OF INVENTION a. Field of Invention

The invention relates generally to steps for pick-up trucks, sport utility vehicles ("SUVs") and other such vehicles, and more particularly, to a retractable tailgate step assembly for facilitating access to the cargo storage area of a vehicle.

b. Description of Related Art

As is known in the art, vans, SUVs, trucks, and other such vehicles commonly include a cargo bed or similar area for storing and transporting large items that would not otherwise fit in typical sedan sized automobiles. Access to cargo beds onboard vans, SUVs, trucks having bed covers, and other similar vehicles is limited when compared to pickup trucks since users cannot reach over the cargo bed sidewalls to access the cargo bed. With increasing versatility and payloads, even pickup truck cargo beds have become relatively difficult to access because cargo beds and their respective sidewalls are placed higher from ground level. Many users of cargo beds are limited to the tailgate area when manipulating the contents of the cargo bed. Loading and unloading objects into such vehicles can be difficult, especially if the object is heavy or elongated.

In an effort to make loading, unloading, and manipulation of objects in vehicle cargo beds easier, the art includes a variety of retractable tailgate steps that are most commonly stowed in or along vehicle tailgates.

For example, U.S. Pat. No. 7,264,253 to Cummings discloses a truck tailgate step that folds into a slideable rack system and is mounted both internally and externally to a vehicle tailgate. Once the tailgate is in a horizontal position, the tailgate step slides away from its stowed position within the tailgate by use of a guide rail bracket 16. The step is then rotated about hinge 30 into a generally vertical position for a user of the cargo bed. Since Cummings discloses a retractable tailgate step that extends from a side of the tailgate, like most steps in the art, it is likely that the horizontal tailgate will obstruct the view of the deployed step when the user, or one of several users, is standing on an opposite side of the tailgate. This scenario creates a hazardous situation in which the user fails to realize that the tailgate step is deployed and attempts to shut the tailgate, thus resulting in potential structural damage to the vehicle.

U.S. Pat. No. 7,261,357 to Bechen discloses a similar tailgate ladder apparatus that extends from the interior of a tailgate to a position perpendicular to the tailgate. The Bechen tailgate ladder also rotates to a deployed position once pulled outwards from the side of the tailgate. Bechen, like Cummings, fails to disclose any feature that would prevent inadvertent harm from attempting to close the horizontal tailgate while the tailgate ladder apparatus is deployed. Further, the design of the tailgate ladder apparatus in the stowed position is revealed in FIG. 3 of Bechen and appears to consume a majority of the length of the internal tailgate cavity. Such an arrangement is not ideal when considering the packaging of tailgate latch components, storage containers, deployable ramps, etc.

In another exemplary tailgate step, U.S. Pat. No. 6,905,158 to Bastian teaches a tailgate pocket step that is inserted into an opening in the tailgate. Instead of at least one support arm extending from the tailgate, the pocket step is formed from a substantially planar plate 310 having at least one hinged platform 360 that is integral with the plate. The platform is coplanar with the plate when stowed inside the tailgate, and rotates outward from the plate when deployed to provide a step. The pocket step disposed on the side of the tailgate poses the same threat, as mentioned above, to bystanders and the vehicle body when a user inadvertently attempts to close the tailgate with the pocket step deployed. In an alternative embodiment shown in FIG. 13, the pocket step is disposed along the trailing edge of the tailgate when the tailgate is in an open position. Though this arrangement would better prevent inadvertent tailgate closings since the deployed step is more visible, the arrangement is not ideal for ingress/egress to the cargo bed. A user standing on either pocket step in FIG. 13 obstructs access to and from the cargo bed, especially when loading and unloading wide objects that extend across the width of the cargo bed.

Such deficiencies in current technology make it desirable to provide a safe and robust tailgate step that would ideally guard against inadvertent closing of the tailgate when the tailgate step is deployed. The step would also grant maximum ingress and egress to the cargo bed for loading and unloading objects. It is further desirable for the tailgate step to compactly stow within or along the tailgate to prevent interference with other tailgate features.

SUMMARY OF THE INVENTION

The invention provides a side mounted step assist mechanism including a step assist mounted to a side of a tailgate and being extendable to a deployed configuration for respectively facilitating ingress and egress into and from a vehicle bed, and being retractable to a stowed configuration for permitting closing of the tailgate.

In an exemplary embodiment, the invention provides a side mounted tailgate step assist mechanism for a vehicle, such as a pickup truck, that may retract from within the tailgate and extend therefrom in order to provide step assist or ingress/egress functions. When the tailgate is moved from a closed or vertical position to a fully open or horizontal position, this may allow the step to be withdrawn from within the step assist module located within an internal cavity of the tailgate and accessible via the side of the tailgate. The step retraction may operate in a cross-car direction by means of a combination of pivoting hinges and slides. In the exemplary embodiment, the step assist module may include a retractable framework, including two horizontal members, housed within static outer horizontal members, that on extending to their fullest extent can be rotated downwards to be positioned in a vertical (or near vertical) orientation to provide a step assist function. At the outer extreme, the retractable members may be joined by a transverse member that creates a step. The step may be released through a latching mechanism, accessible from the side of the tailgate, potentially, but not necessarily within the visible area of the step assist module when stowed.

The invention allows a vehicle user to gain access to the truck cargo area via the open tailgate, even when loading goods that might cover the rear (trailing edge) of the tailgate or extend across the width of the cargo bed. In addition to the step, users may support themselves when accessing the truck bed by utilizing a hand hold molded within the D-pillar horizontal trim, or a pivotally mounted step assist arm. While the step assist module is in the extended position, a lockout device may be deployed to prevent the tailgate from being returned from the open or horizontal position to the closed or vertical position. This lockout device, independent of the step module, may operate through a hinged link that is attached to the tailgate at one end and the D-pillar member of the truck bed at the other end. This link may be extended to a locked position when the tailgate is fully extended or open, while optionally requiring a user to release a catch or pin for the link to collapse and allow tailgate closing. This lockout would thus prevent damage to the step or cosmetic damage to the vehicle, should an attempt be made to close the tailgate when the step is deployed.

In a particular embodiment, the invention provides a vehicle tailgate side mounted step assist mechanism attachable to a vehicle including a vehicle bed coupled to one or more pillars and a tailgate pivotally attached to the vehicle bed for providing access to the vehicle bed in a tailgate open position and securing contents of the vehicle bed in a tailgate closed position, the tailgate having one or more sides generally orthogonal to the pivotal attachment and capable of engaging a pillar when the tailgate is in the tailgate closed position. The mechanism may include a slide assembly mountable along a side of the tailgate for deployment when the tailgate is in the tailgate open position, the slide assembly including a plurality of guide channels, generally parallel supports that communicate with the guide channels to extend away from and generally orthogonal to the side of the tailgate, a step rotation limit apparatus acting between the guide channels and the supports, and a tailgate step disposable between the supports at a predetermined distance from the side of the tailgate. A lockout device may be disposable between the pillar and the side of the tailgate when the tailgate is in the tailgate open position, the lockout device being capable of preventing the tailgate from returning to the tailgate closed position when the slide assembly is deployed, with the lockout device further capable of stowing between the pillar and the tailgate when the tailgate is in the tailgate closed position. The supports may rotate generally about the side of the tailgate when the supports are extended and the step rotation limit apparatus restricts rotation of the tailgate step when the supports and tailgate step are in a deployed configuration.

For the vehicle tailgate side mounted step assist mechanism described above, the guide channels of the slide assembly may include a primary guide channel that slidably engages a secondary guide channel which engages one of the generally parallel supports. The mechanism may include one or more slots in the primary or secondary guide channels and one or more step positioning tabs mounted to the other of the primary or secondary guide channels for engaging the slot and maintaining the primary and secondary guide channels in a predetermined position relative to each other. The step rotation limit apparatus may include chamfered ends provided on the generally parallel supports for limiting rotation of the supports when the chamfered ends contact the guide channels. The step rotation limit apparatus may include hooks disposed at ends of the generally parallel supports and openings disposed along the guide channels, the hooks capable of engaging the openings in the channels to limit rotation of the supports when the step assist mechanism is deployed. The side of the tailgate may include a cavity for substantially stowing the generally parallel supports and the tailgate step. The mechanism may further include a step lock and release mechanism disposed along the side of the tailgate adjacent the slide assembly for maintaining the slide assembly in a stowed configuration and for selectively releasing the slide assembly to achieve a deployed configuration.

The invention also provides a vehicle tailgate side mounted step assist mechanism attachable to a vehicle including a vehicle bed coupled to at least one pillar and a tailgate pivotally attached to the vehicle bed for providing access to the vehicle bed in a tailgate open position and securing contents of the vehicle bed in a tailgate closed position, with the tailgate having sides generally orthogonal to the pivotal attachment and capable of engaging a pillar when the tailgate is in the tailgate closed position. The mechanism may include one or more generally parallel supports rotatably mountable to a side of the tailgate, the supports capable of being deployed when the tailgate is in the tailgate open position and stowed when the tailgate is in the tailgate closed position. The tailgate step may be disposable between the supports at a predetermined distance from the side of the tailgate, and a lockout device may prevent the tailgate from returning to the tailgate closed position when the tailgate step is deployed. The supports may be rotatable generally about the side of the tailgate when the mechanism is mounted to the tailgate and the tailgate is in the tailgate open position to orient the tailgate step for a user of the vehicle bed.

For the vehicle tailgate side mounted step assist mechanism described above, the guide channels of the slide assembly may include a primary guide channel that slidably engages a secondary guide channel which engages one of the generally parallel supports. The mechanism may further include one or more slots in the primary or secondary guide channels and one or more step positioning tabs mounted to the other of the primary or secondary guide channels for engaging the slot and maintaining the primary and secondary guide channels in a predetermined position relative to each other. The tailgate step between the generally parallel supports may be pivotally attached to the supports and is capable of rotating and maintaining a generally horizontal step position when the mechanism is deployed for use. The generally parallel supports may include chamfered ends proximal to the guide channels, the ends capable of limiting rotation of the supports when the ends substantially contact the channels. The mechanism may further include hooks disposed at ends of the generally parallel supports and openings disposed along the guide channels, the hooks capable of engaging the openings in the channels to limit rotation of the supports when the step assist mechanism is deployed. Alternatively, the mechanism may include a step lock and release mechanism disposed along the side of the tailgate adjacent the slide assembly for maintaining the slide assembly in a stowed configuration and for selectively releasing the slide assembly to achieve a deployed configuration.

The invention yet further provides a vehicle including a tailgate side mounted step assist mechanism, the vehicle including a vehicle bed coupled to one or more pillars, a tailgate pivotally attached to the vehicle bed for providing access to the vehicle bed in a tailgate open position and securing contents of the vehicle bed in a tailgate closed position, the tailgate having sides generally orthogonal to the pivotal attachment and respectively capable of engaging a pillar when the tailgate is in the tailgate closed position. A slide assembly may be disposed along a side of the tailgate for deployment when the tailgate is in the tailgate open position, the slide assembly including a plurality of guide channels, generally parallel supports that communicate with the guide channels to extend away from and generally orthogonal to the side of the tailgate, a step rotation limit apparatus acting between the guide channels and the supports, and a tailgate step disposable between the supports at a predetermined distance from the side of the tailgate. A lockout device may prevent the tailgate from returning to the tailgate closed position when the tailgate step is deployed. The supports may be rotatable when extended to orient the tailgate step for a user of the vehicle bed and the step rotation limit apparatus restricts rotation of the tailgate step when the supports and tailgate step are deployed.

For the mechanism described above, a step lock and release mechanism disposed along the side of the tailgate adjacent the slide assembly for maintaining the slide assembly in a stowed configuration and for selectively releasing the slide assembly to achieve a deployed configuration. The guide channels of the slide assembly may include a primary guide channel that slidably engages a secondary guide channel which engages one of the generally parallel supports. The mechanism may further include one or more slots in the primary or secondary guide channels and one or more step positioning tabs mounted to the other of the primary or secondary guide channels for engaging the slot and maintaining the primary and secondary guide channels in a predetermined position relative to each other.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 20A is an isometric view of another embodiment of an apparatus for limiting rotation of the tailgate step relative to the tailgate;

DETAILED DESCRIPTION OF PREFERRED EMBODIMENTS

Figure 1:
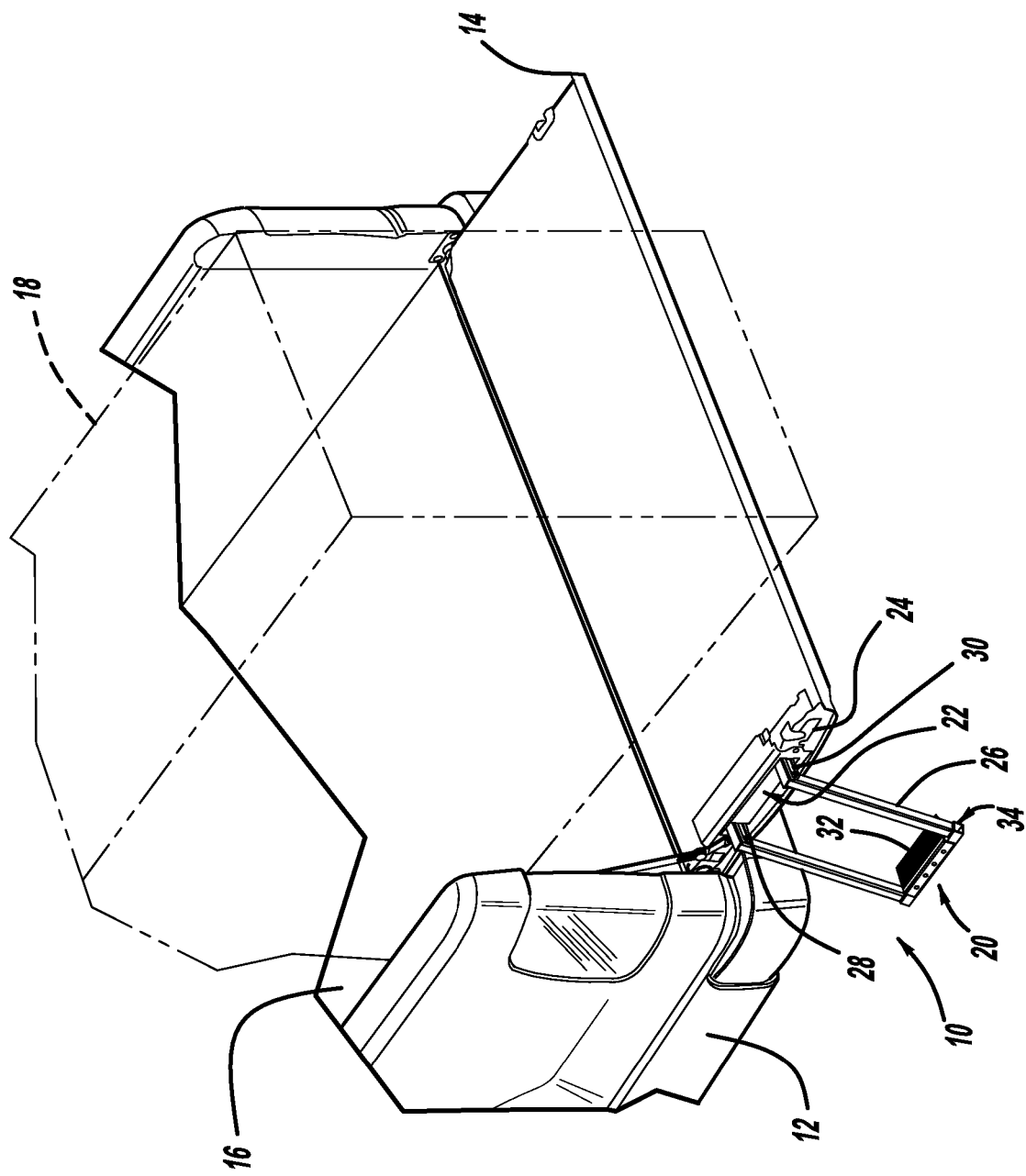
FIG. 1 is an isometric view of a pick-up truck with a tailgate in an open horizontal position, and a side mounted tailgate step assist according to the present invention in a deployed configuration, with the truck bed including an oversized object that covers the rear (trailing edge) of the tailgate.

Referring now to the drawings wherein like reference numerals designate corresponding parts throughout the several views, FIGS. 1-20B illustrate various views of a vehicle tailgate step assist mechanism according to the present invention, the mechanism being hereinafter generally designated "side mounted step assist mechanism 10."

Figure 2:
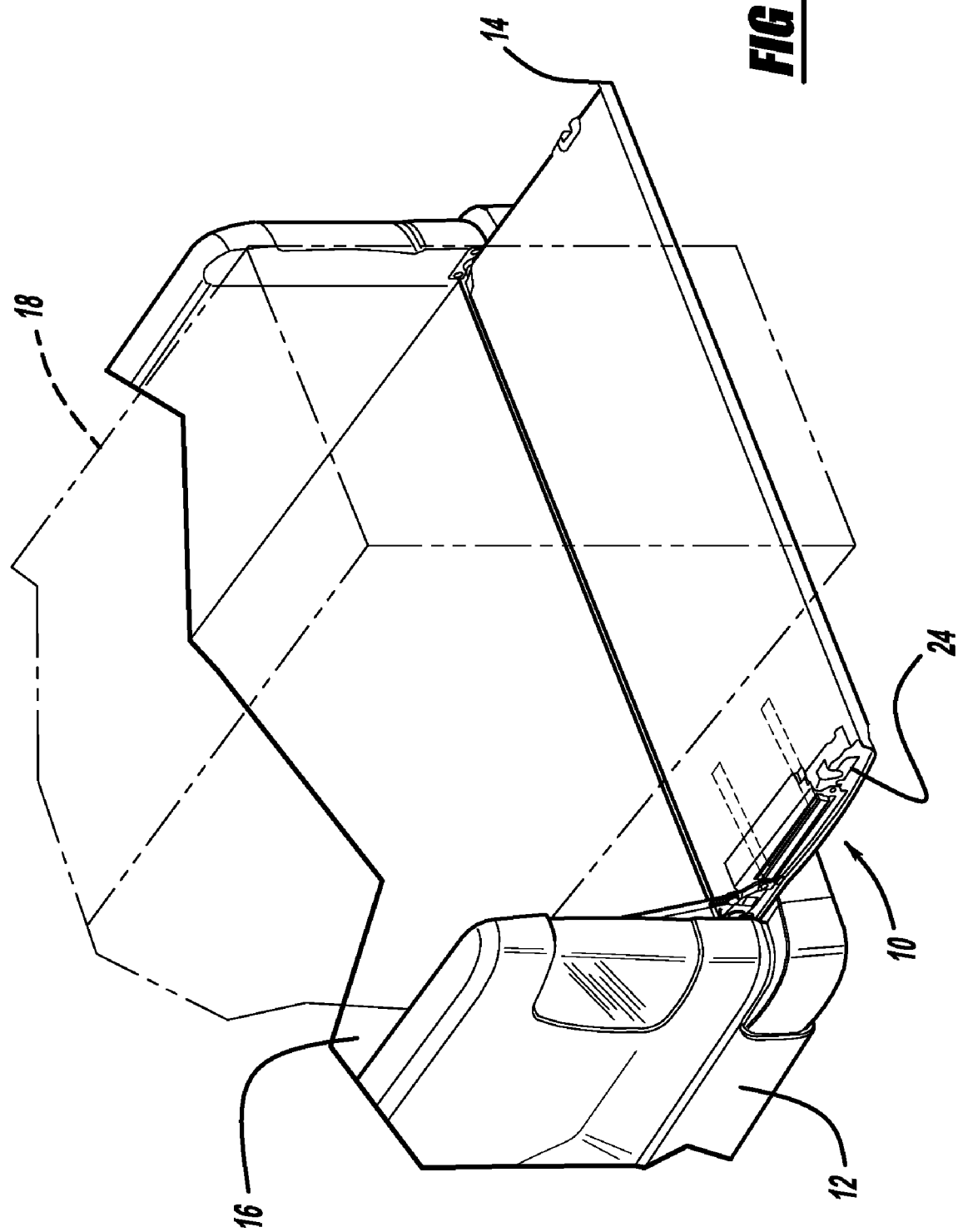
FIG. 2 is an isometric view of the pick-up truck of FIG. 1, with the tailgate in the open horizontal position and the side mounted tailgate step assist of FIG. 1 retracted, with the step assist shown in hidden, with the truck bed including an oversized object that covers the rear (trailing edge) of the tailgate.
Figure 3:
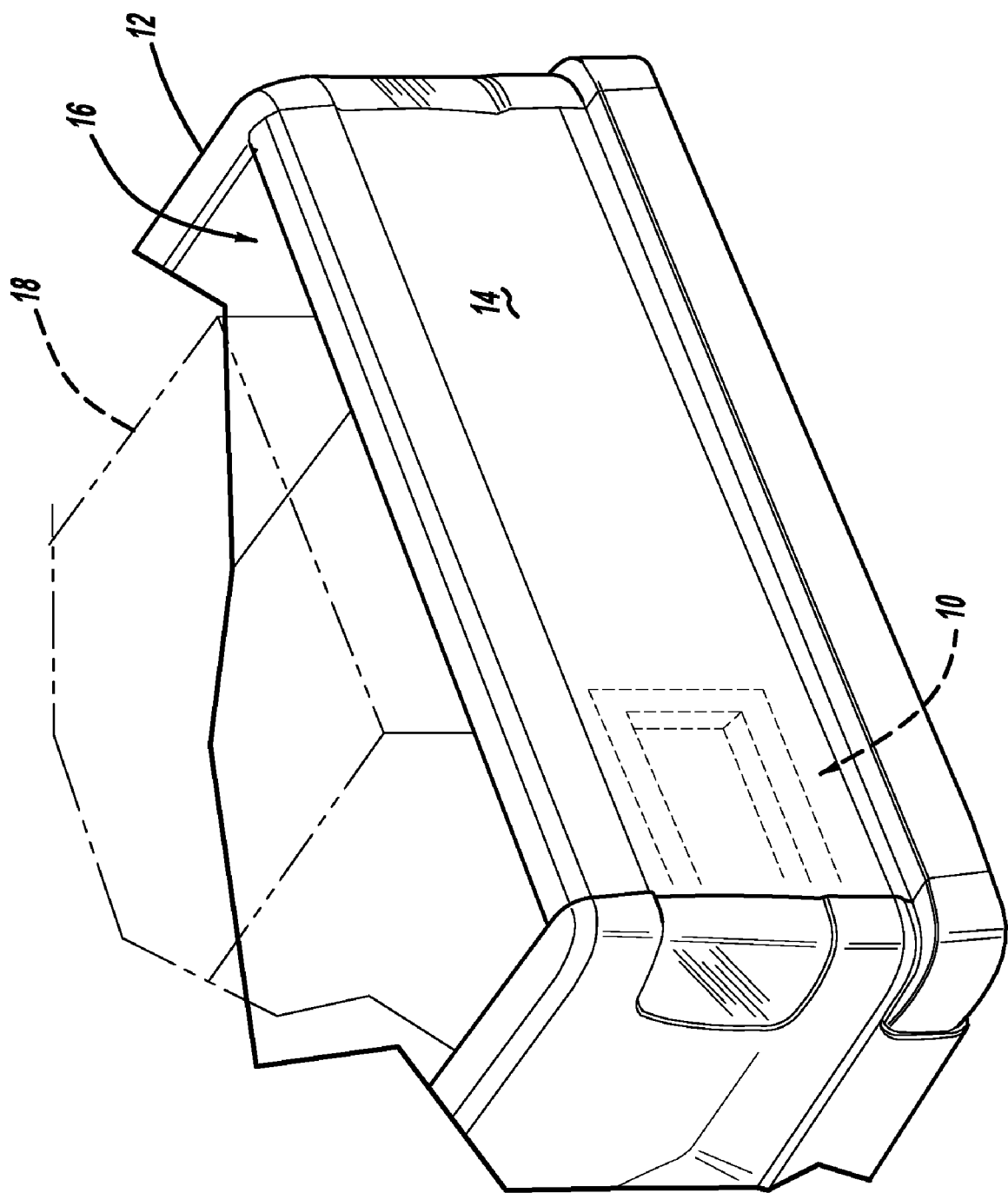
FIG. 3 is an isometric view of the pick-up truck of FIG. 1, with the tailgate in a closed position and the side mounted tailgate step assist of FIG. 1 retracted, with the step assist shown in hidden, and with the truck bed including an oversized object disposed therein.

As shown in FIGS. 1-3, side mounted step assist mechanism 10 may generally be mounted onto a vehicle 12, which in the exemplary embodiment illustrated, may be a pickup truck including a tailgate 14. As shown in FIG. 1 and described in greater detail below, in order to facilitate ingress and egress into and from vehicle bed 16 especially in the event of loading or unloading of goods 18 that cover the rear (trailing edge) of the tailgate, mechanism 10 may be deployable from the side of tailgate 14, and as shown in FIG. 2 and described in greater detail below, mechanism 10 may be readily retractable within the side of tailgate 14 for allowing opening/closing of the tailgate in a known manner.

The various sub-components of side mounted step assist mechanism 10 will now be described in detail with reference to FIGS. 1-18.

Figure 11:
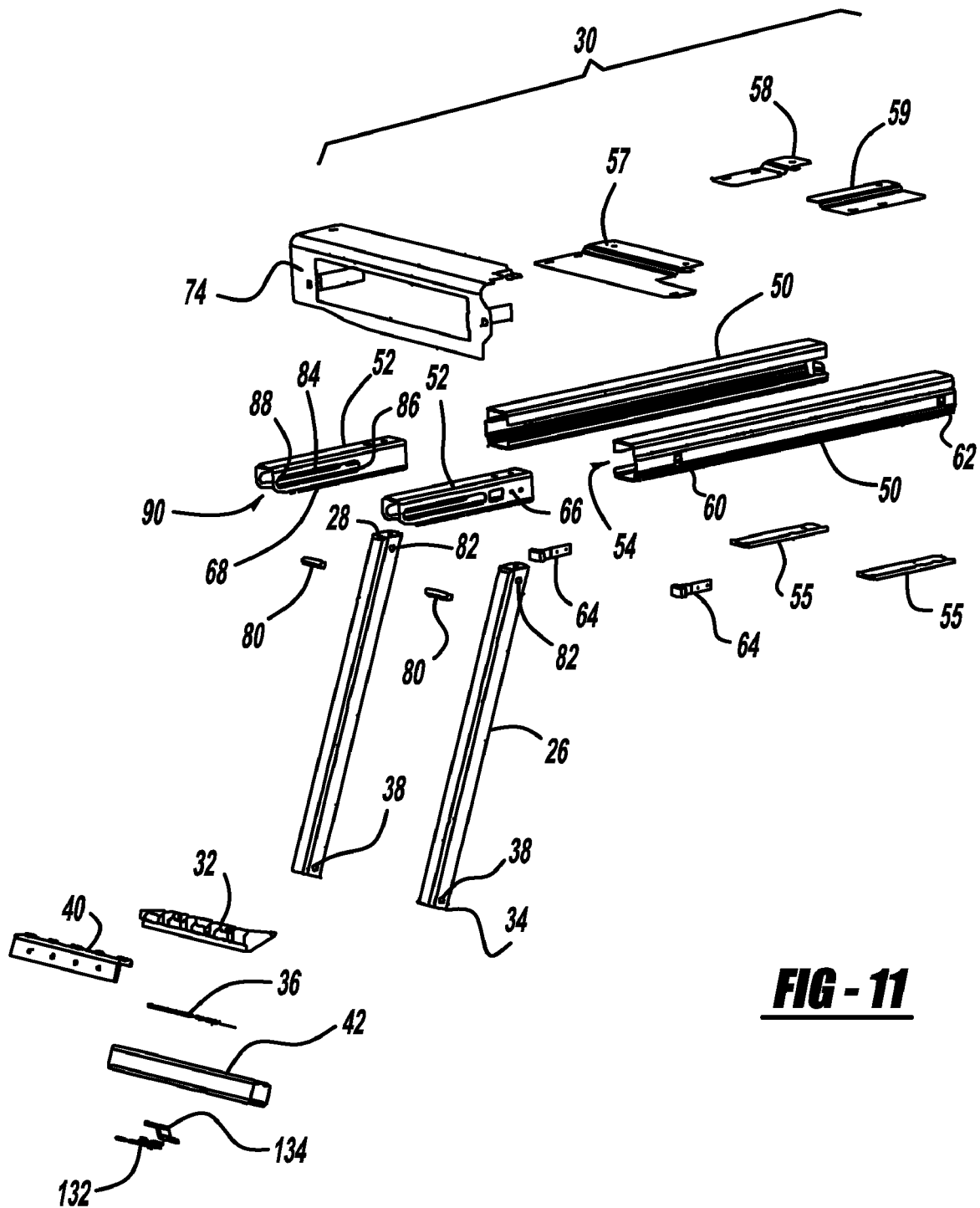
FIG. 11 is an exploded view of the components of the side mounted tailgate step assist of FIG. 1.
Figure 12:
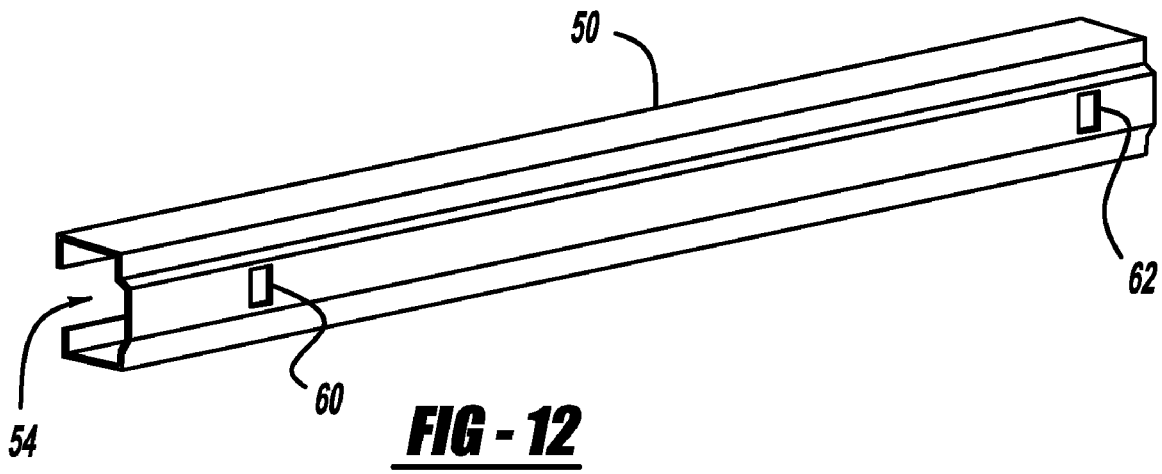
FIG. 12 is an isometric enlarged view of a primary guide channel for facilitating extension/retraction of the side mounted tailgate step assist of FIG. 1.
Figure 13:
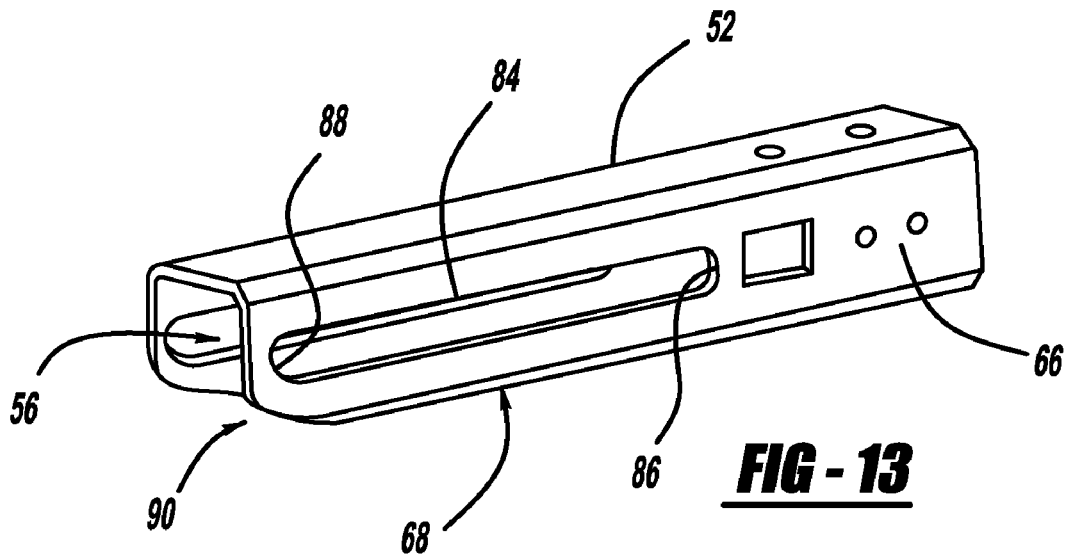
FIG. 13 is an isometric enlarged view of a secondary guide channel, slidably disposable in the primary guide channel of FIG. 12, for facilitating extension/retraction of the side mounted tailgate step assist of FIG. 1.
Figure 14:
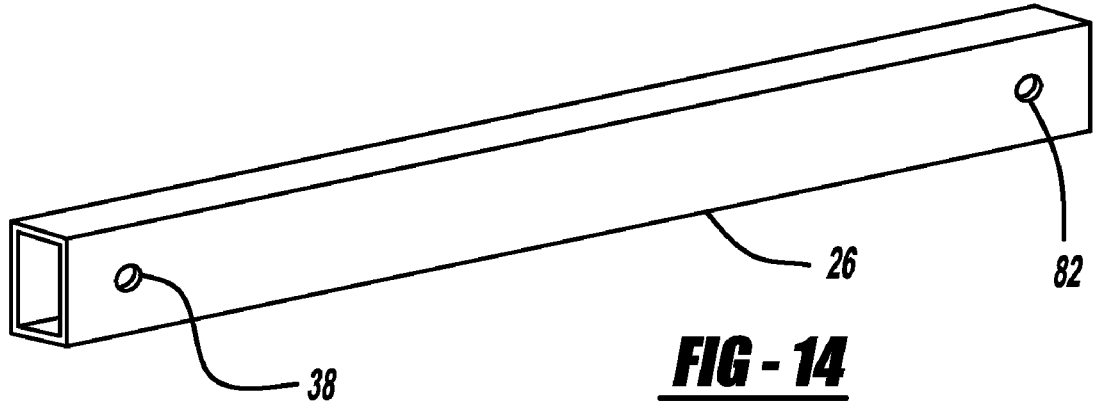
FIG. 14 is an isometric enlarged view of a guide rail, slidably disposable in the primary and secondary guide channels of FIGS. 12 and 13, for facilitating extension/retraction of the side mounted tailgate step assist of FIG. 1.

Specifically, as shown in FIGS. 1-3, side mounted step assist mechanism 10 may generally include a tailgate step 20 mounted within cavity 22 of tailgate 14 and disposed at side 24 of the tailgate. Those skilled in the art would readily appreciate in view of this disclosure that a mirror-image step may be disposed at the opposite side of the tailgate for facilitating ingress/egress from either side of vehicle 12. Tailgate step 20 may be slidably extendable to the deployed configuration of FIG. 1 and slidably retractable to the stowed configuration of FIG. 2. In the embodiment illustrated, tailgate step 20 may include parallel supports 26 pivotally mounted at ends 28 thereof to slide assembly 30, and including a step surface 32 at end 34 thereof. Referring to FIG. 11, step surface 32 may be pivotally mounted to supports 26 via pivot pin 36 disposable in complementary apertures 38 provided in supports 26, with the pivoting feature provided for maintaining the upper surface of step surface 32 in a generally horizontal configuration during use. Further, step surface 32 may be fixedly engaged with L-shaped bracket 40 and reinforcement beam 42, each of which form the stepping area for step 20 as shown in FIGS. 1 and 11.

Figure 21:
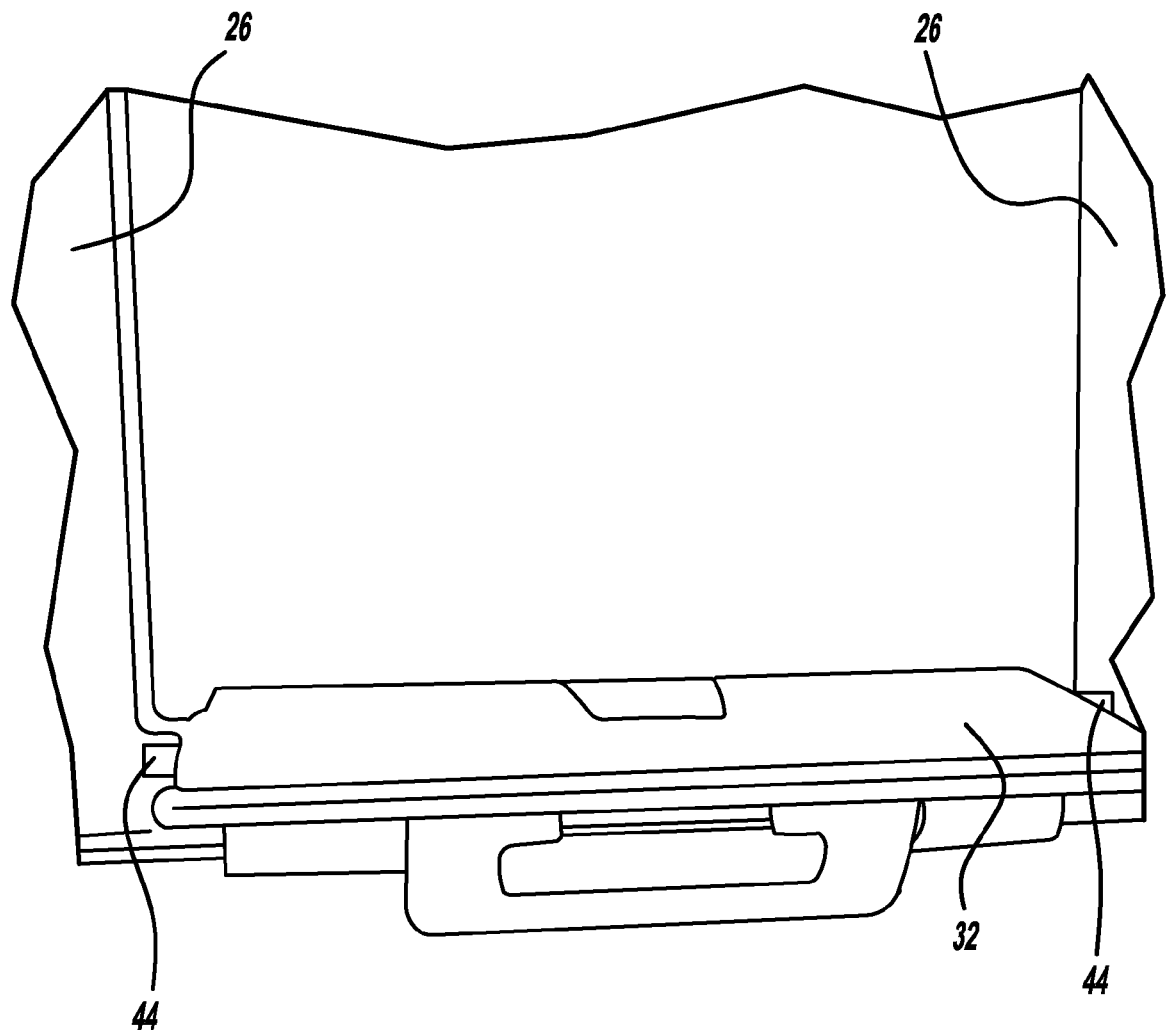
FIG. 21 is a side cut-out view of the tailgate step in a deployed position.
Figure 22:
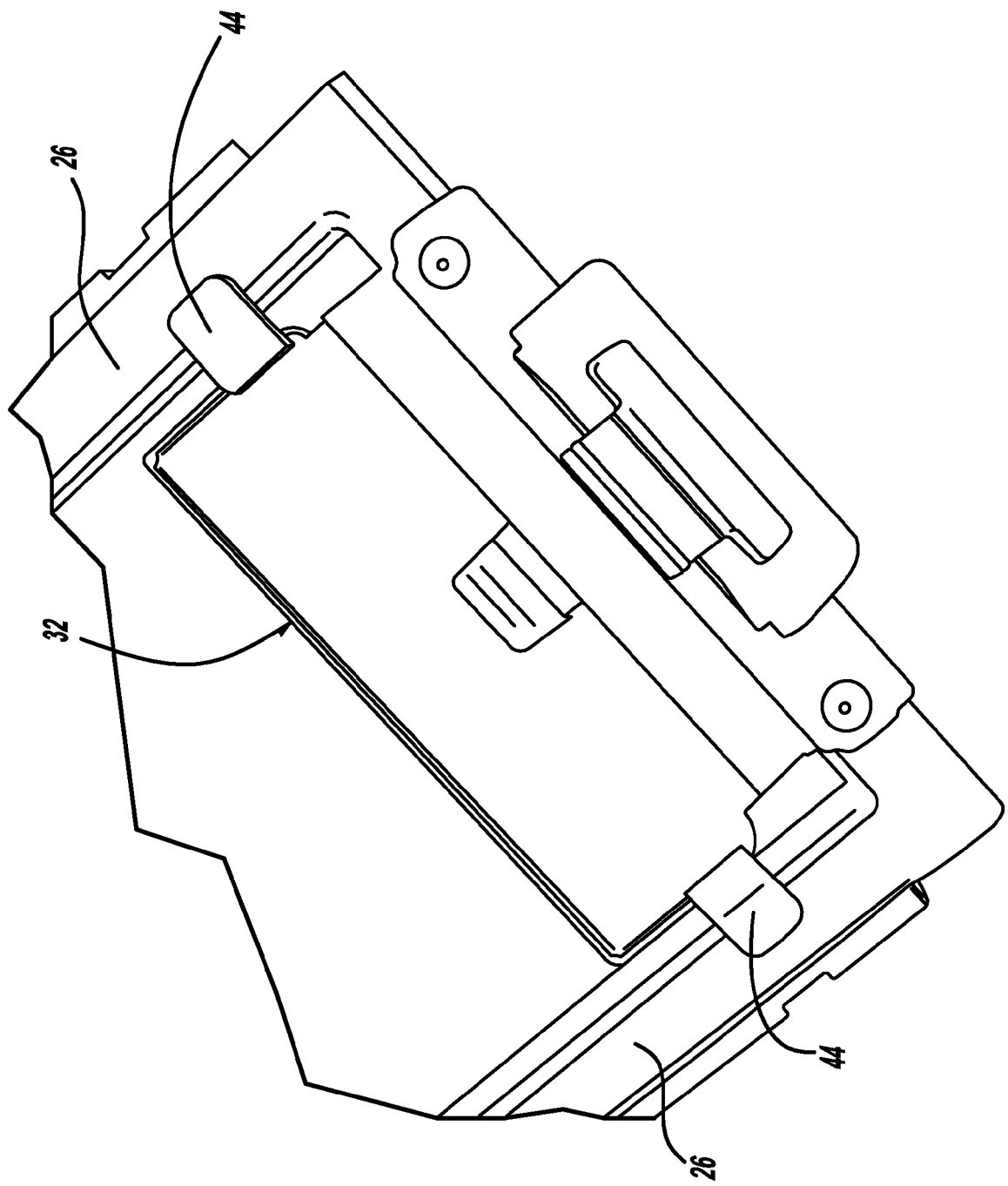
FIG. 22 is an isometric view of the tailgate step in a stowed position.

In one embodiment, as shown in FIGS. 21 and 22, tailgate step 20 may include step placement tabs 44 for compactly positioning step surface 32 in the stowed configuration. Step surface 32 may be rotated between the deployed configuration of FIG. 21 and the stowed configuration of FIG. 22. Step placement tabs 44 protrude from the sides of step surface 32 and contact parallel supports 26 when step surface 32 is rotated to the stowed configuration. This configuration allows step surface 32 to align with parallel supports 26 and stow between parallel supports 26 such that tailgate step 20 requires minimal volume within cavity 22 of tailgate 14. The parallel supports may also have indentations (not shown) so that step placement tabs 44 sit flush along parallel supports 26 when in the stowed configuration.

Referring to FIGS. 1-3 and 8-11, slide assembly 30 may include primary and secondary guide channels 50, 52 mounted within tailgate 14 and including guide rails formed as supports 26 slidably disposed therein (note the terms guide rails and supports 26 will hereinafter be used interchangeably). As shown in FIG. 11, primary guide channel 50 may include a C-shaped channel 54 for complementary slidable engagement with secondary guide channel 52. Further, secondary guide channel 52 may include an opening 56 for slidable engagement with guide rail 26. As shown in FIG. 11, additional bracket components 55, 57, 58 and 59 may be provided for mounting of slide assembly 30.

The sliding movement of slide assembly 30 will now be described in detail with reference to FIGS. 1-3 and 8-18.

Figure 15:
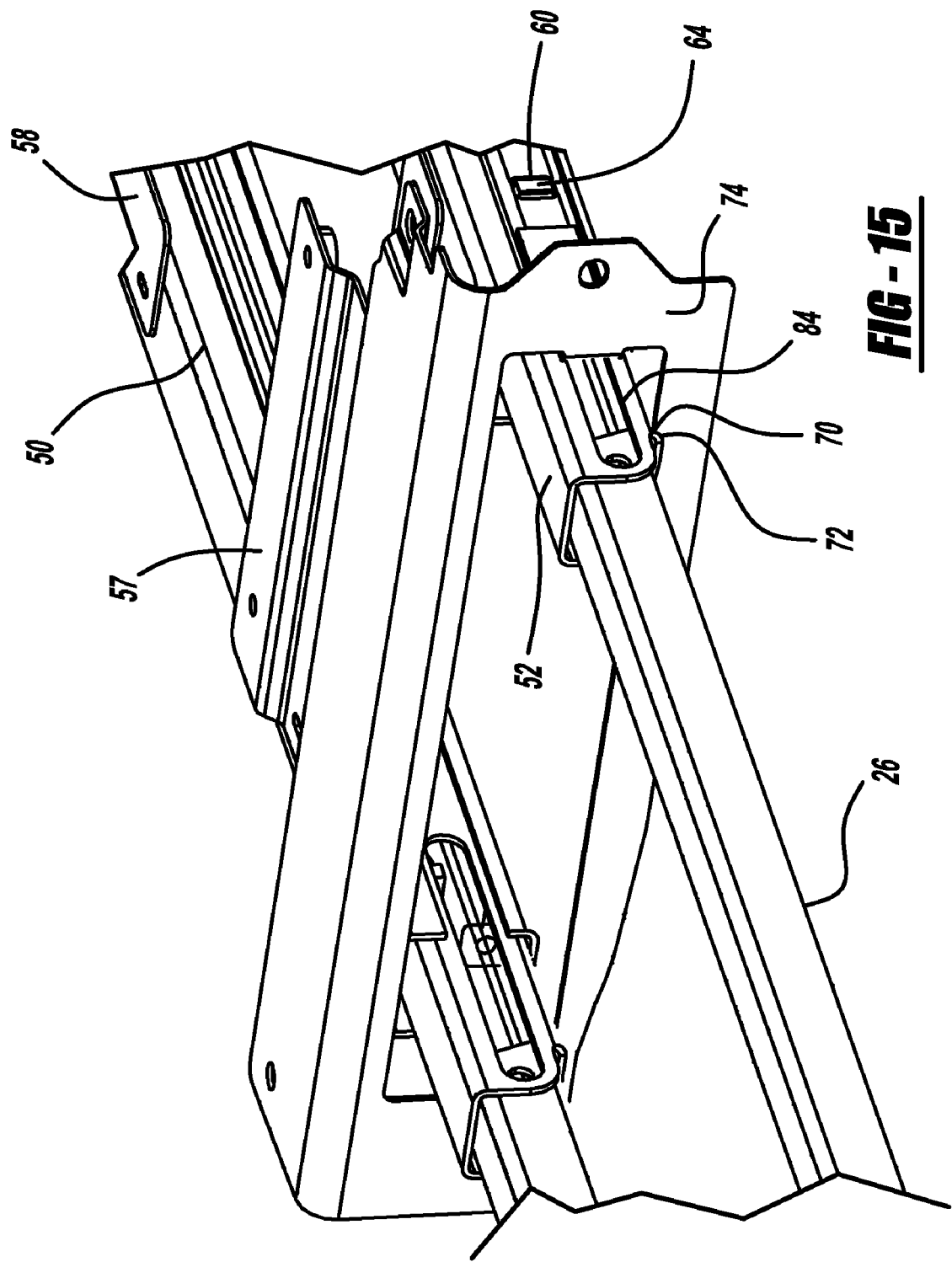
FIG. 15 is an isometric cutout view of the side mounted tailgate step assist of FIG. 1, illustrating a step positioning tab in a first engaged configuration.

Specifically, referring to FIGS. 1-3, 8-11 and 15-18, primary guide channel 50 may include slots 60, 62 for snap-fit engagement of step positioning tabs 64 mounted to secondary guide channels 52 at location 66. In the embodiment illustrated, tabs 64 may be made of plastic or another resilient material. Thus when secondary guide channel 52 is disposed in primary guide channel 50, as step 20 is pulled from the retracted configuration of FIG. 8 to the extended configurations of FIGS. 9 and 10, in the configuration of FIG. 9, step positioning tab 64 is disengaged from slot 62 and engaged with slot 60 to thus hold step 20 in the configuration of FIG. 9. In this configuration, referring to FIG. 11, bottom support 68 of secondary guide channel 52 prevents step 20 from pivoting down to the configuration of FIG. 10. As step 20 is pulled further to the configuration of FIG. 10, the engagement of tab 64 with slot 60 and as shown in FIG. 15, the engagement of detent edges 70, 72 respectively of secondary guide channel 52 and mounting bracket 74 prevent further relative sliding movement of secondary guide channel 52 within primary guide channel 50.

Figure 9:
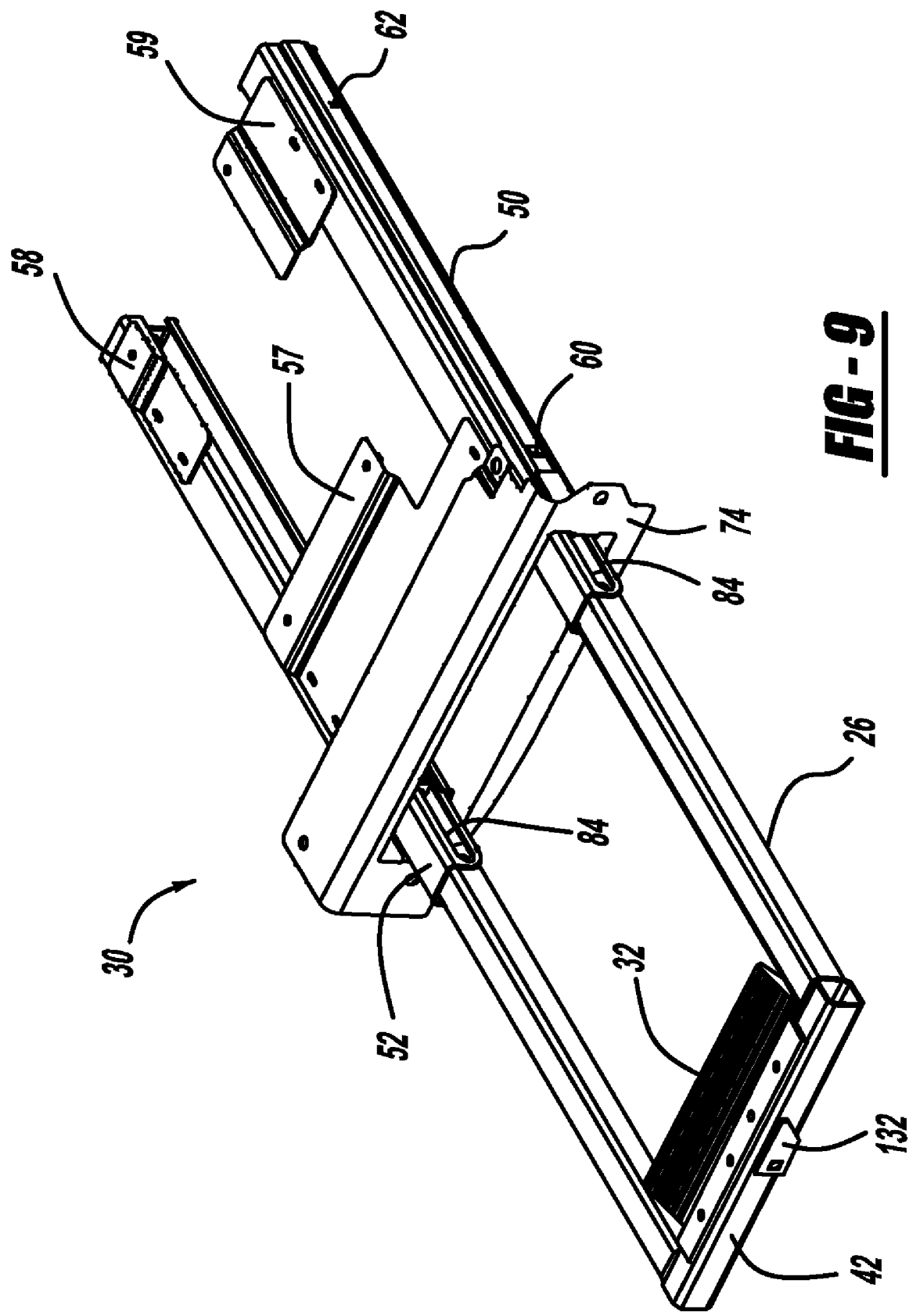
FIG. 9 is an isometric view of the side mounted tailgate step assist of FIG. 1 in an intermediate extended (deployed) configuration.
Figure 10:
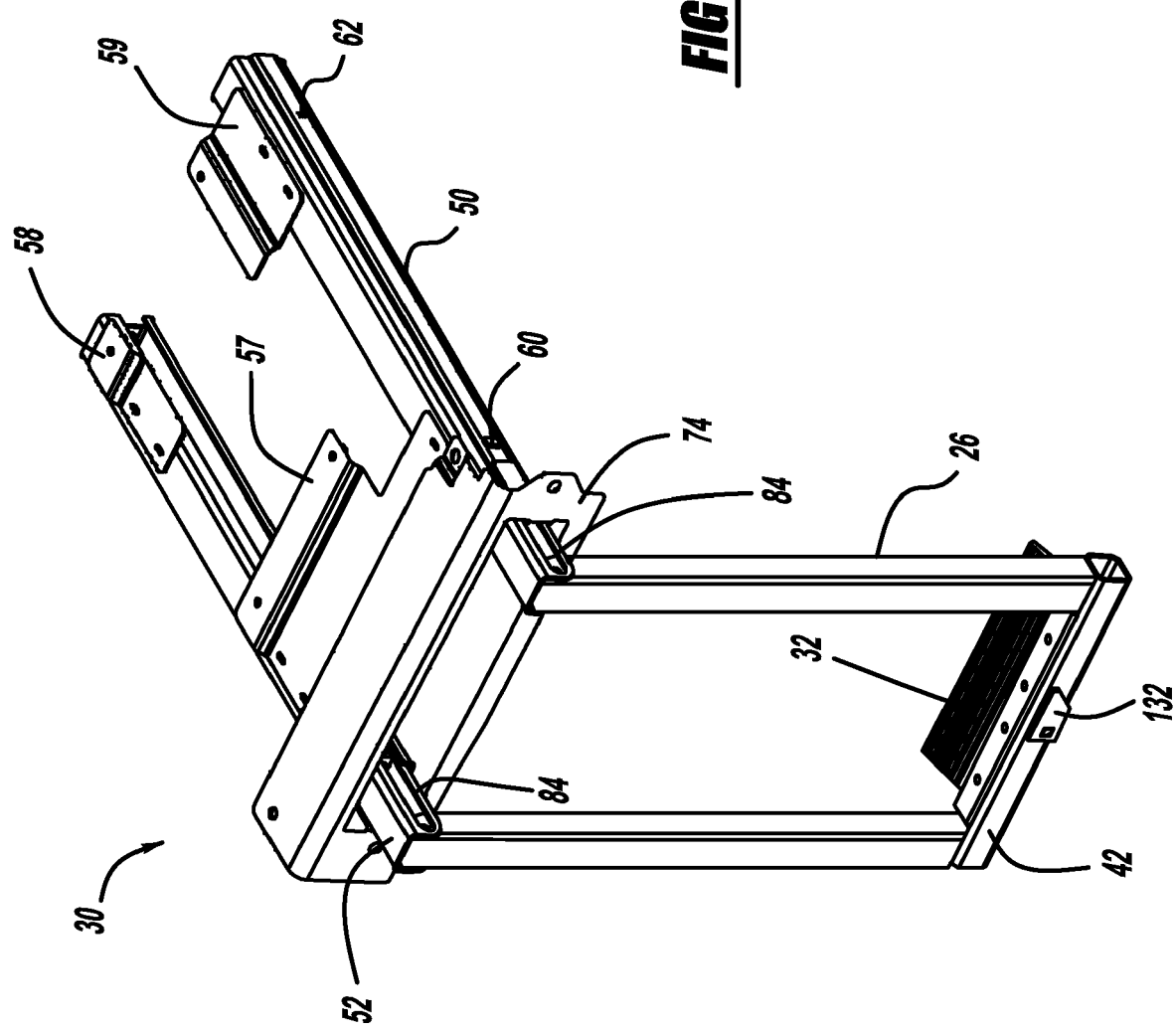
FIG. 10 is an isometric view of the side mounted tailgate step assist of FIG. 1 in a fully extended (deployed) configuration.

At this stage, referring to FIGS. 9-11, pivot pins 80 provided within apertures 82 of guide rails (i.e. supports) 26 may slide within elongated slots 84 from first to second ends 86, 88 of slots 84. Once pins 80 engage ends 88 of slots 84, opening 90 adjacent bottom support 68 may thus allow guide rails 26 to pivot downward to place step 20 in the fully deployed configuration of FIG. 10.

Figure 19A:
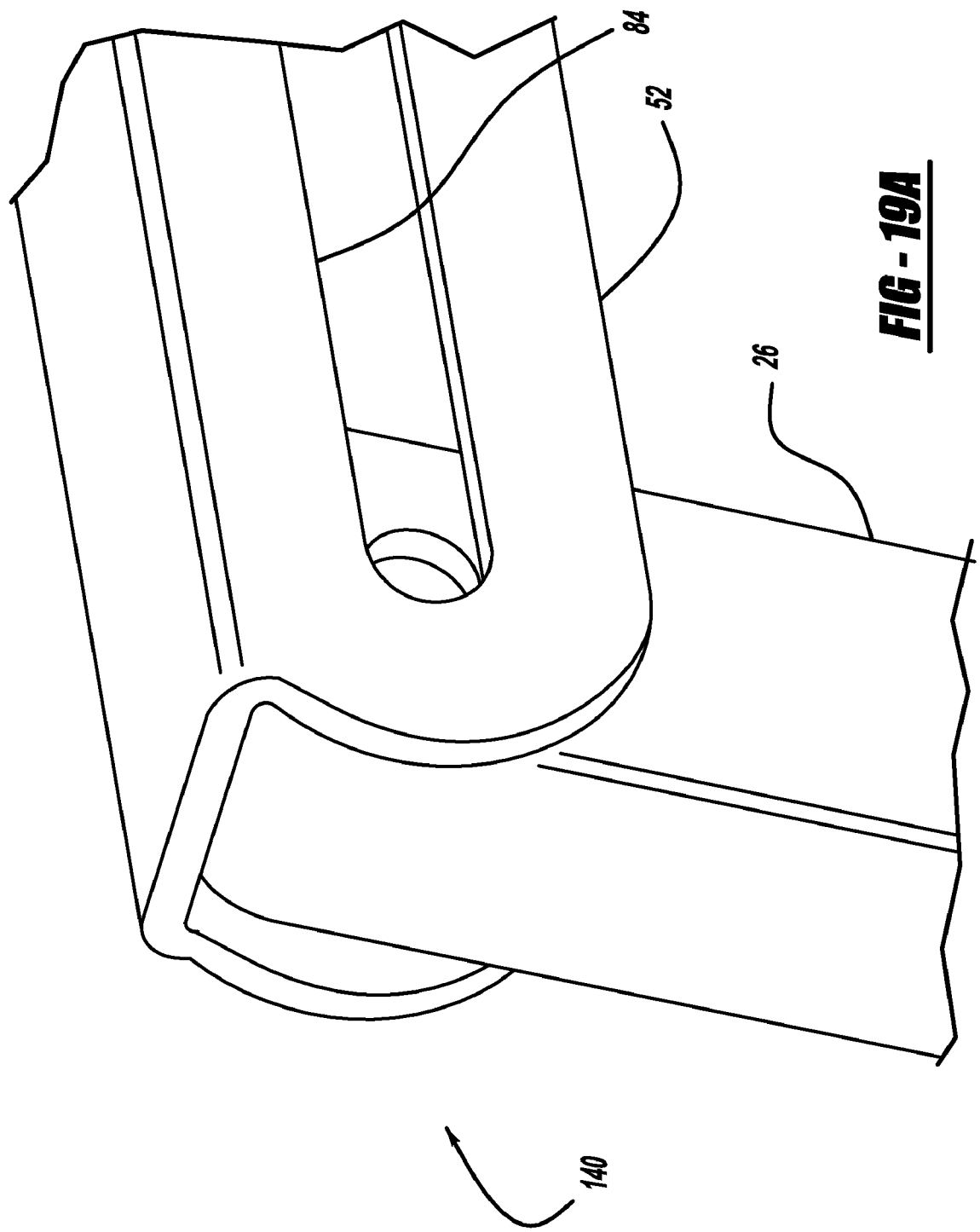
FIG. 19A is an isometric view of an embodiment of an apparatus for limiting rotation of the tailgate step relative to the tailgate.
Figure 19B:
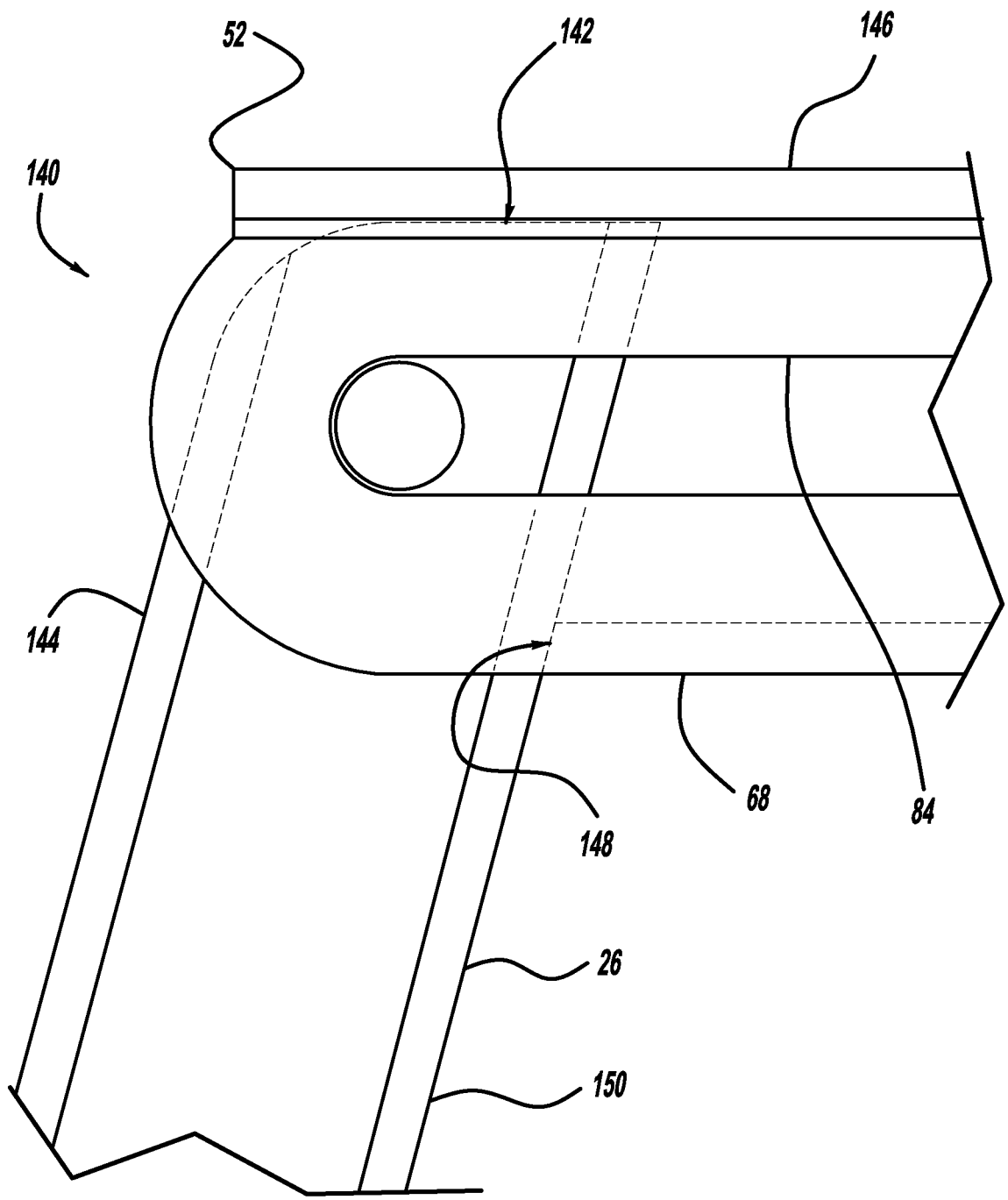
FIG. 19B is a side cut-out view of the apparatus of FIG. 19A.

In order to limit rotation of step 20 relative to the vertical direction to prevent contact of the step with side 24 of the tailgate and to further support a user in a predetermined position when step 20 is deployed, referring to FIGS. 19A and 19B, a step rotation limit apparatus 140 may be provided. Apparatus 140 may generally include the guide rails 26 including an edge 142 chamfered at approximately 85° relative to upper surface 144, with edge 142 contiguously engageable with the underside of upper surface 146 of secondary guide channel 52 as shown in FIG. 19B. Secondary guide channel 52 may also include a chamfered edge 148 at bottom support 68 for engagement with bottom surface 150 of guide rails 26. In this manner, as illustrated in FIGS. 19A and 19B, in the fully deployed configuration of FIG. 10, step 20 may be disposed at approximately 15° relative to the vertical direction.

Figure 20B:
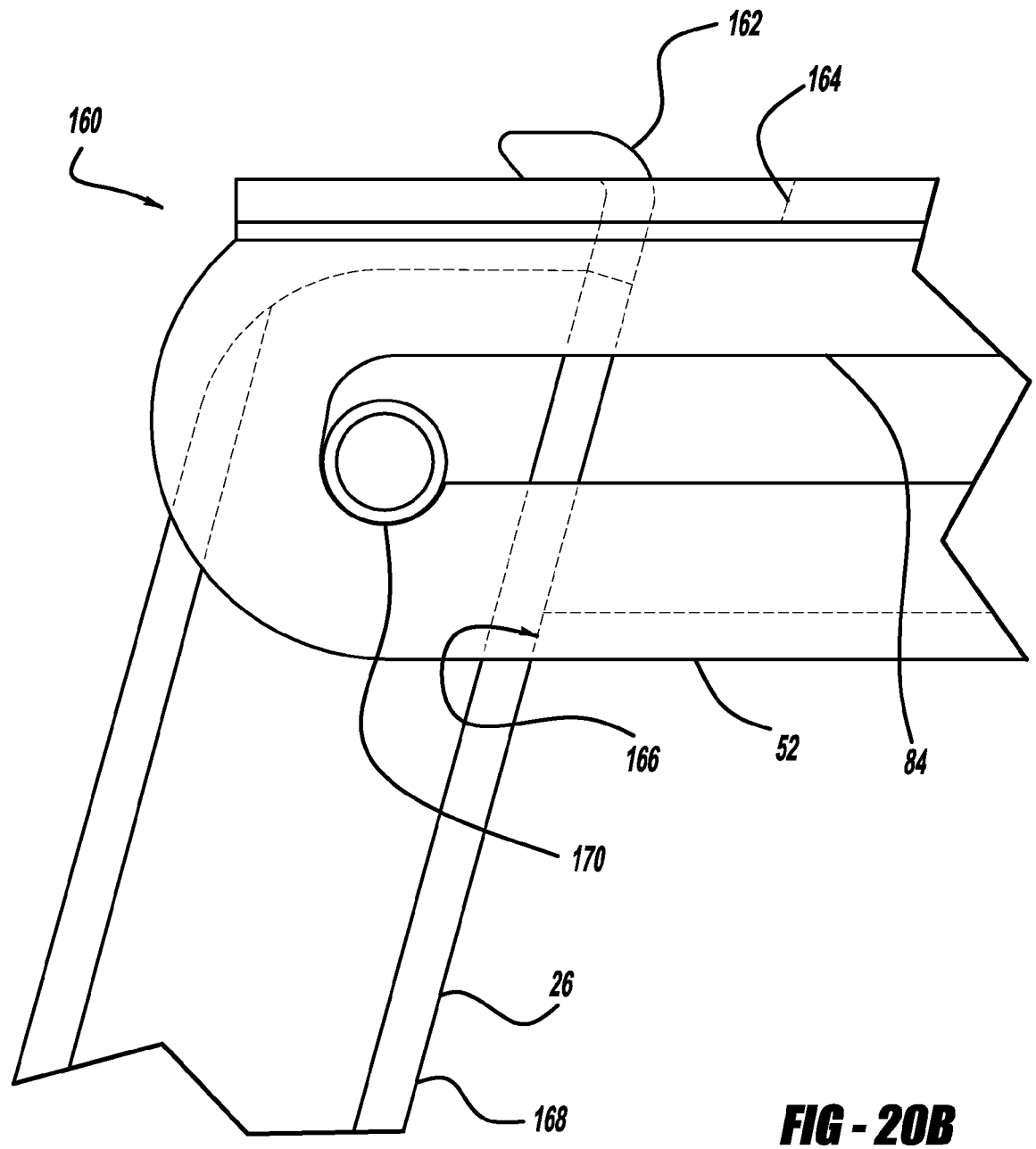
FIG. 20B is a side cut-out view of the apparatus of FIG. 20A.

Alternatively, in another embodiment, referring to FIGS. 20A and 20B, a step rotation limit apparatus 160 may likewise prevent contact of the step with side 24 and support a user in a predetermined position when step 20 is deployed. Apparatus 160 may generally include the guide rails 26 including a hook 162 engageable with opening 164 provided in secondary guide channel 52. As with apparatus 140, secondary guide channel 52 may also include a chamfered edge 166 at bottom support 68 for engagement with bottom surface 168 of guide rails 26. Further, elongated slot 84 of secondary guide channel 52 may include a recessed section 170 for maintaining pivot pins 80 in position when step 20 is deployed, and thus requiring upward lifting of step 20 for moving the step to the retracted configuration of FIG. 8. In this manner, as illustrated in FIGS. 20A and 20B, in the fully deployed configuration of FIG. 10, step 20 may be likewise disposed at approximately 15° relative to the vertical direction. Those skilled in the art would readily appreciate in view of this disclosure that the angles of the aforementioned surfaces may be readily modified as needed for changing the overhang angle of step 20.

Figure 8:
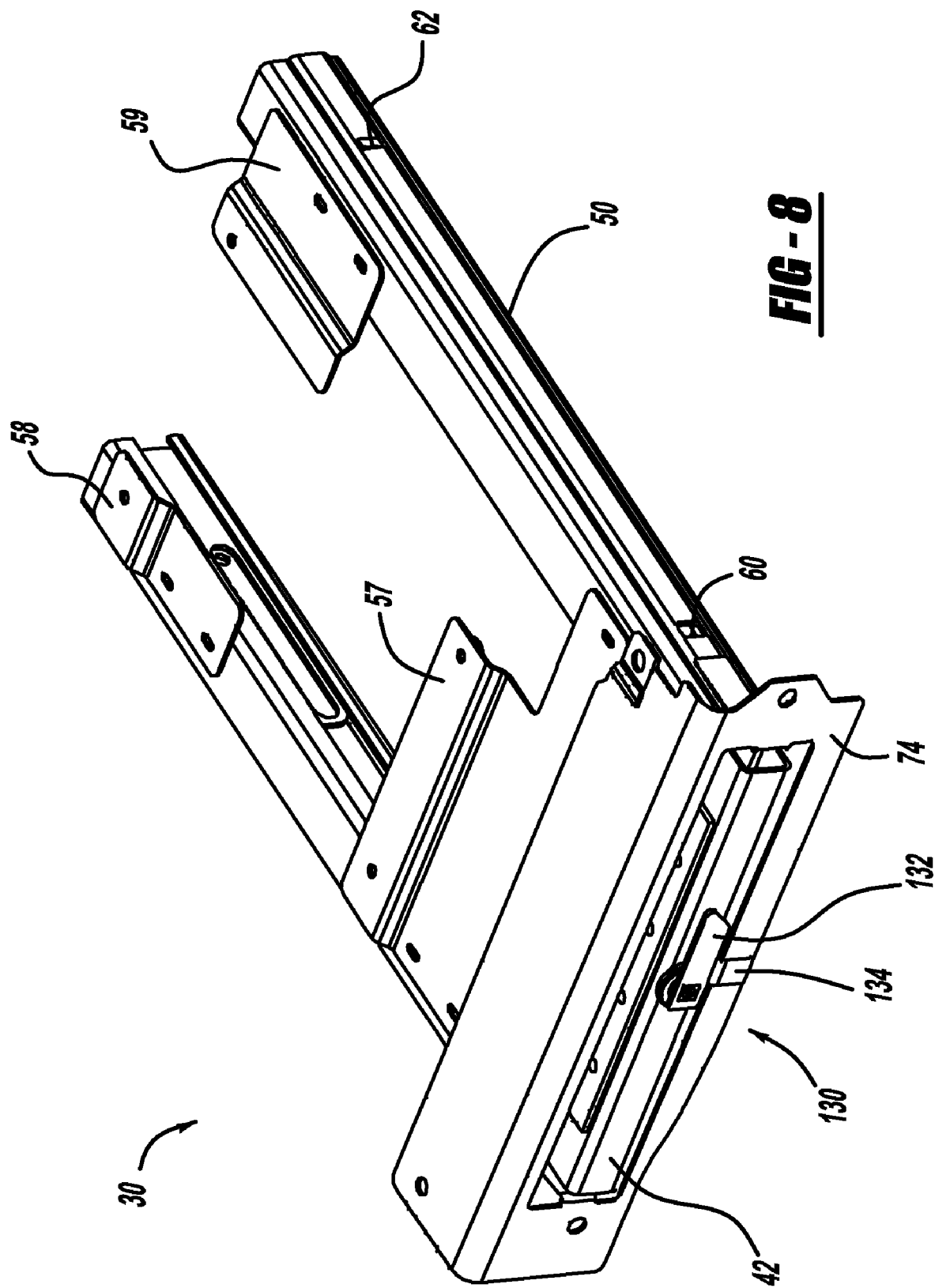
FIG. 8 is an isometric view of the side mounted tailgate step assist of FIG. 1 in a retracted configuration.
Figure 16:
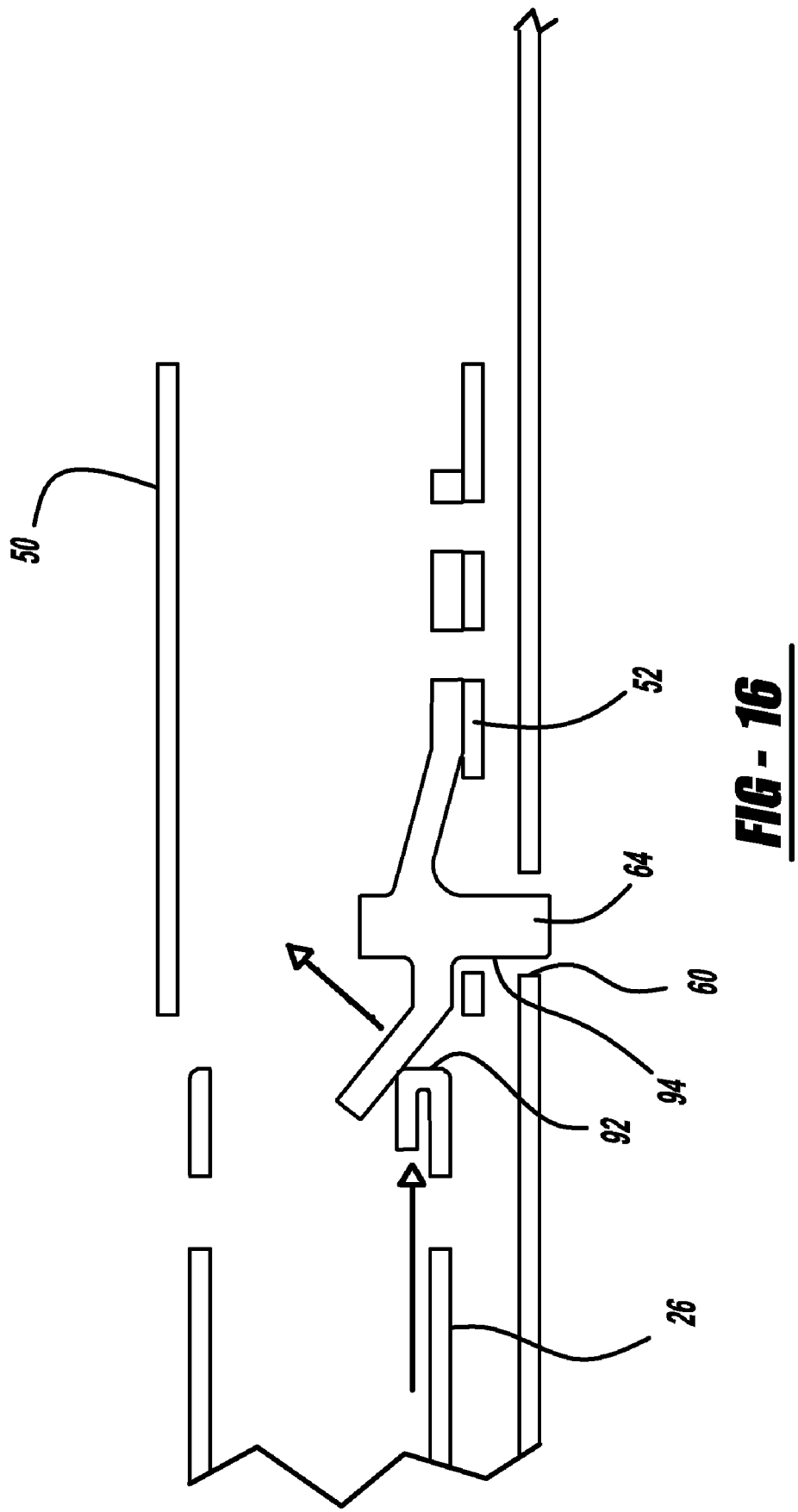
FIG. 16 is a top cutout view illustrating the step positioning tab of FIG. 15 in the first engaged configuration.
Figure 17:
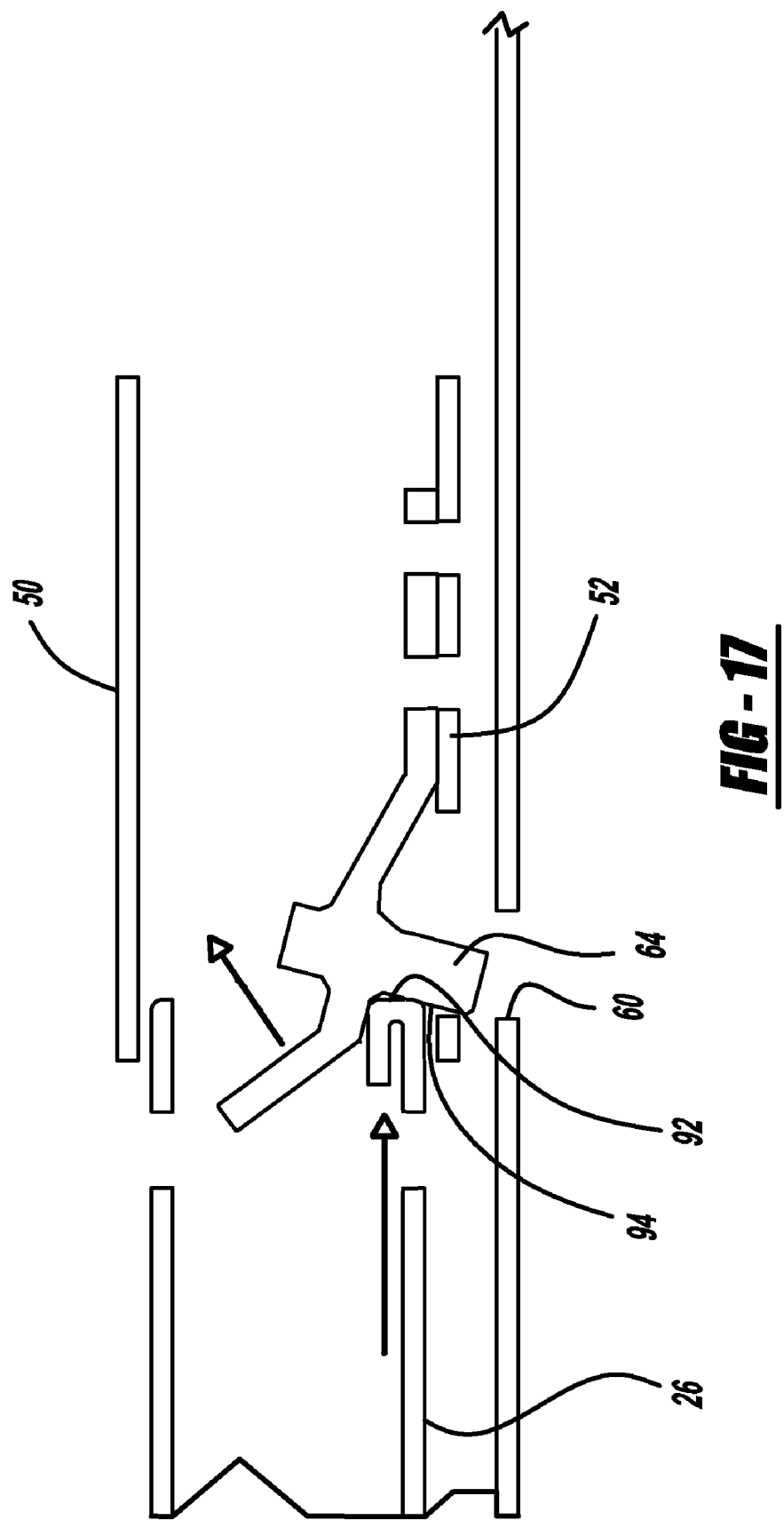
FIG. 17 is a top cutout view illustrating the step positioning tab of FIG. 15 in a disengaged configuration.
Figure 18:
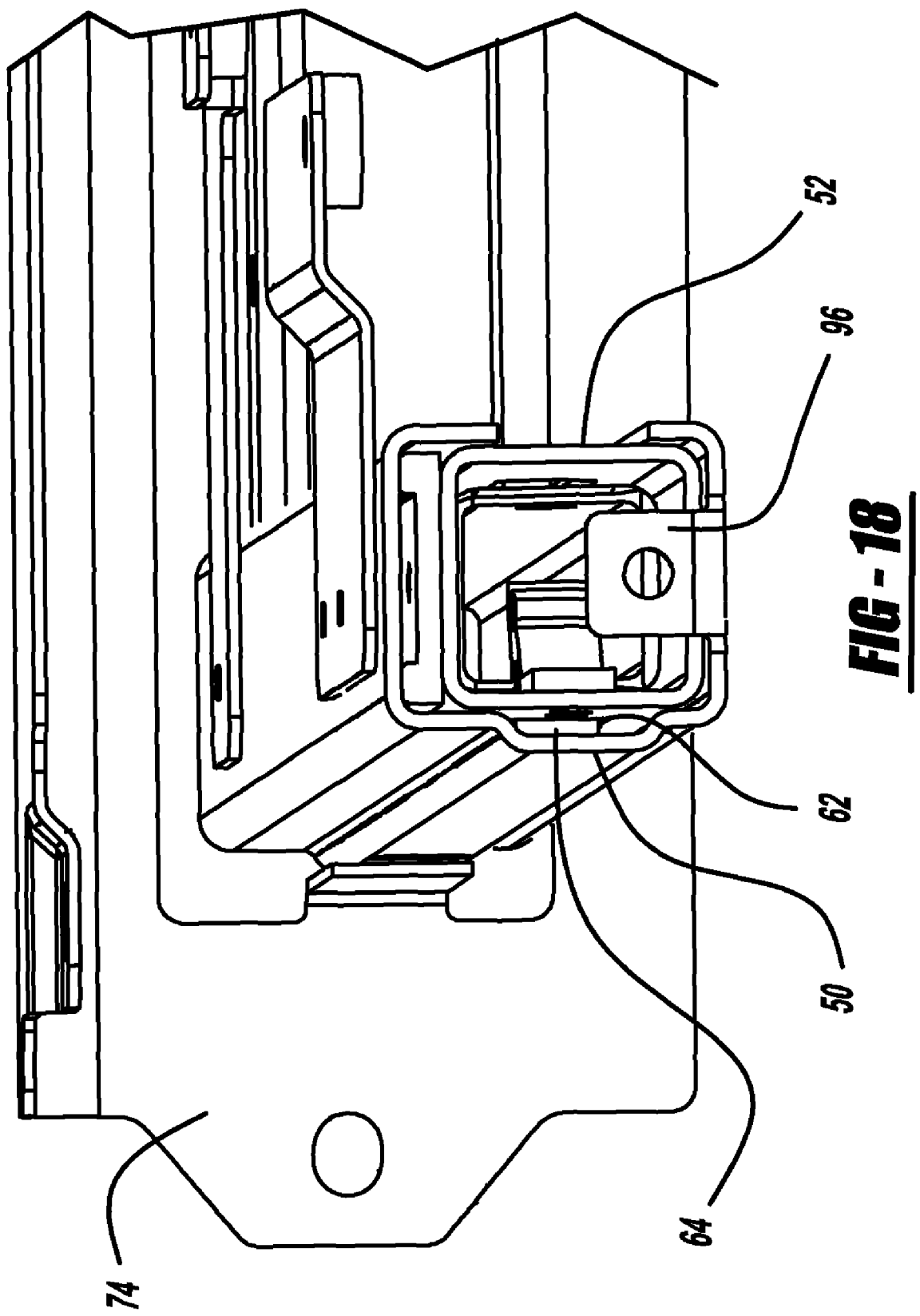
FIG. 18 is an isometric cutout view of the side mounted tailgate step assist of FIG. 1, illustrating the step positioning tab of FIG. 15 in a second engaged configuration.

In order to return step 20 to its retracted configuration of FIG. 8, referring to FIGS. 8-11 and 15-18, with step 20 rotated to the configuration of FIG. 9 from the FIG. 10 fully deployed configuration, referring to FIGS. 16 and 17, step 20 may be simply pushed inwards towards its fully retracted configuration of FIG. 8. In the FIGS. 16 and 17 configurations, edges 92 of guide rails 26 may push sides 94 of tabs 64 to rotate tabs 64 in the clockwise direction of FIGS. 16 and 17 and thus disengage tabs 64 from slots 60. As movement of step 20 is continued to the FIG. 8 fully retracted position, tabs 64 may eventually engage slots 62 to thus prevent further movement of step 20. Those skilled in the art would readily appreciate in view of this disclosure that additional stops, such as stops 96 may be provided at end of primary guide channels 50 for providing an additional means of limiting inward movement of step 20.

Figure 4:
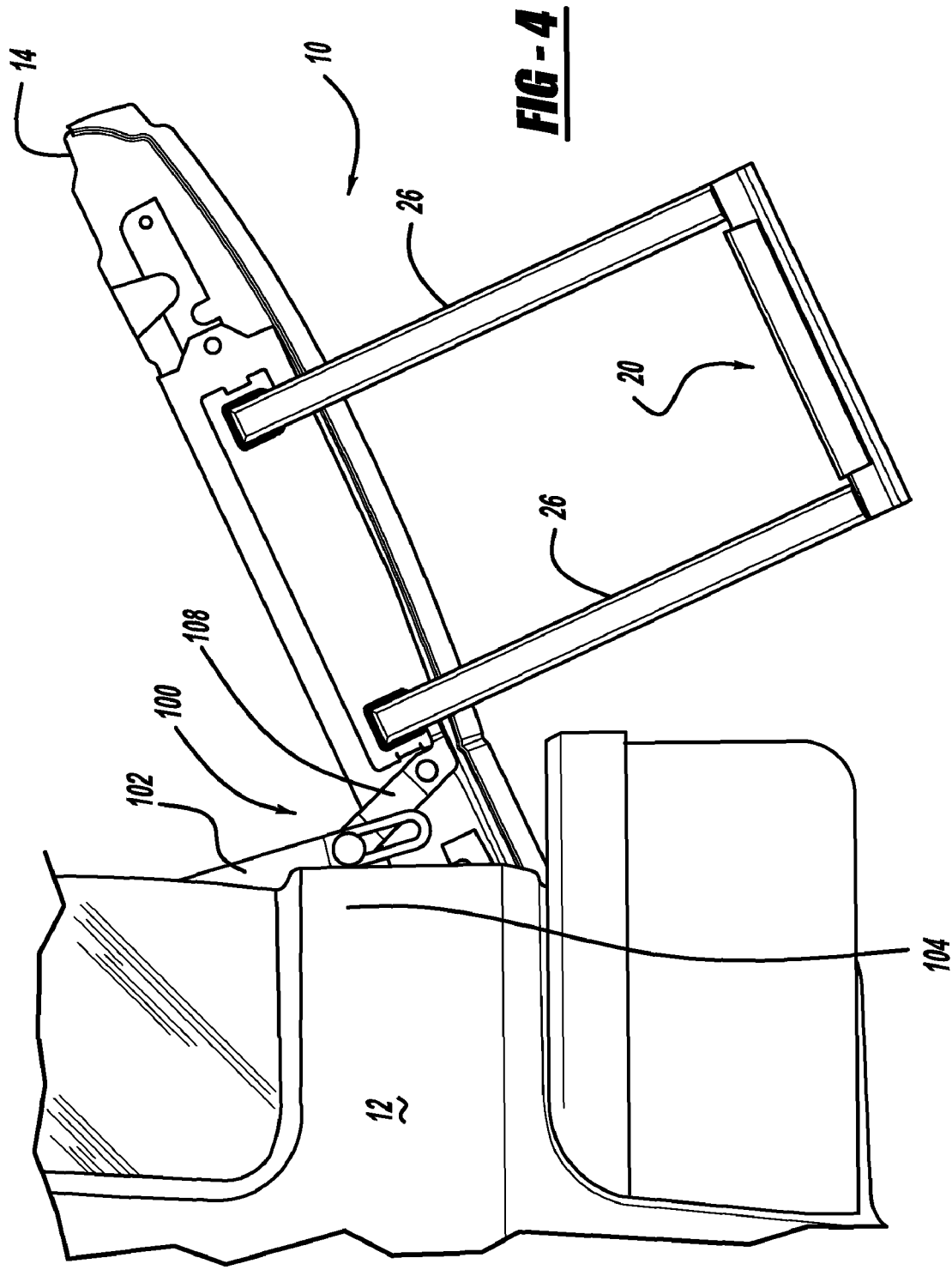
FIG. 4 is a side view of a lockout device for preventing inadvertent closing of the tailgate with the side mounted tailgate step assist disposed in the deployed configuration of FIG. 1, and the tailgate pivoted upwardly to illustrate operation of the lockout device.
Figure 5:
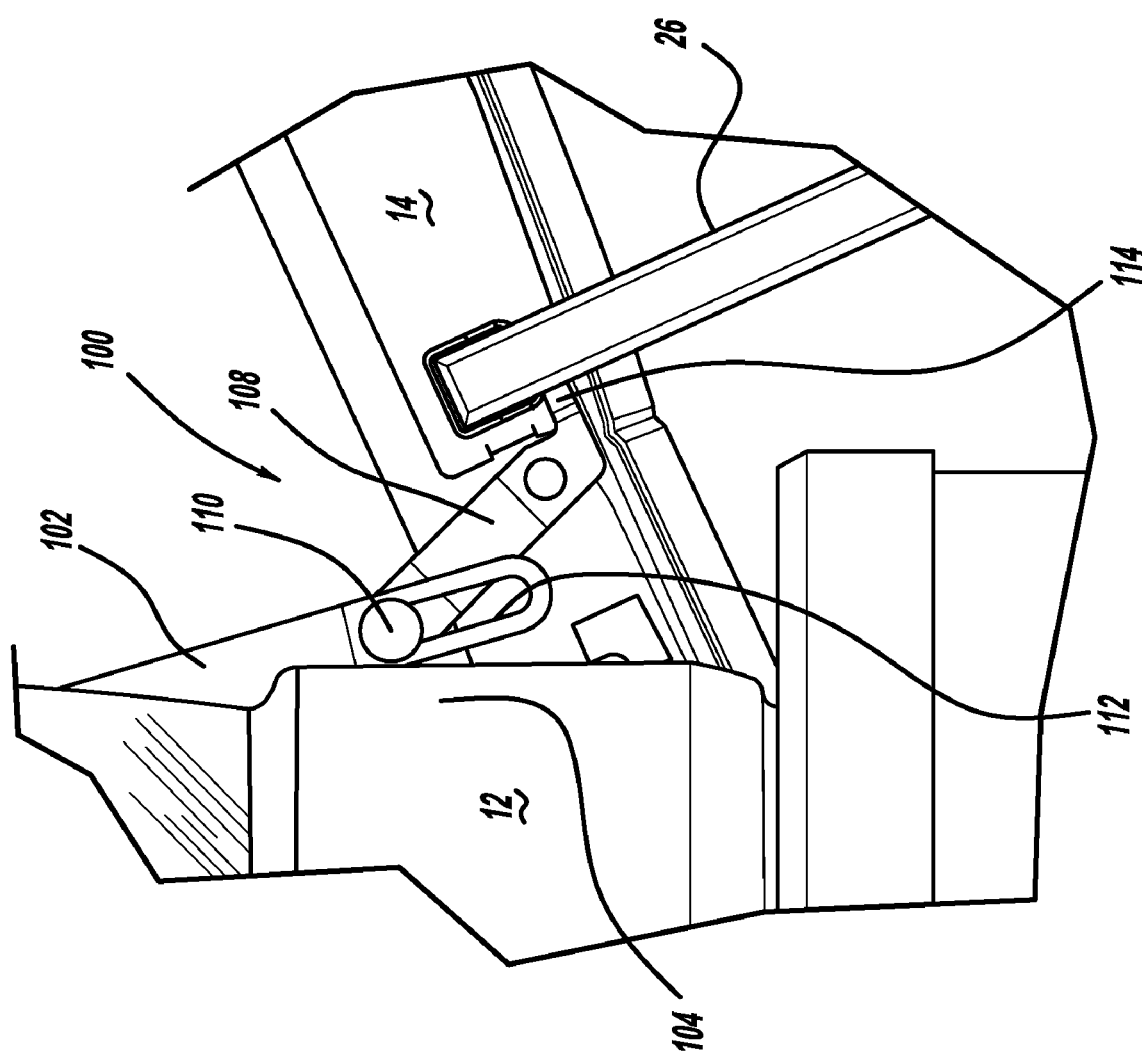
FIG. 5 is an enlarged side view of the lockout device of FIG. 4 with the side mounted tailgate step assist disposed in the deployed configuration of FIG. 1.
Figure 6:
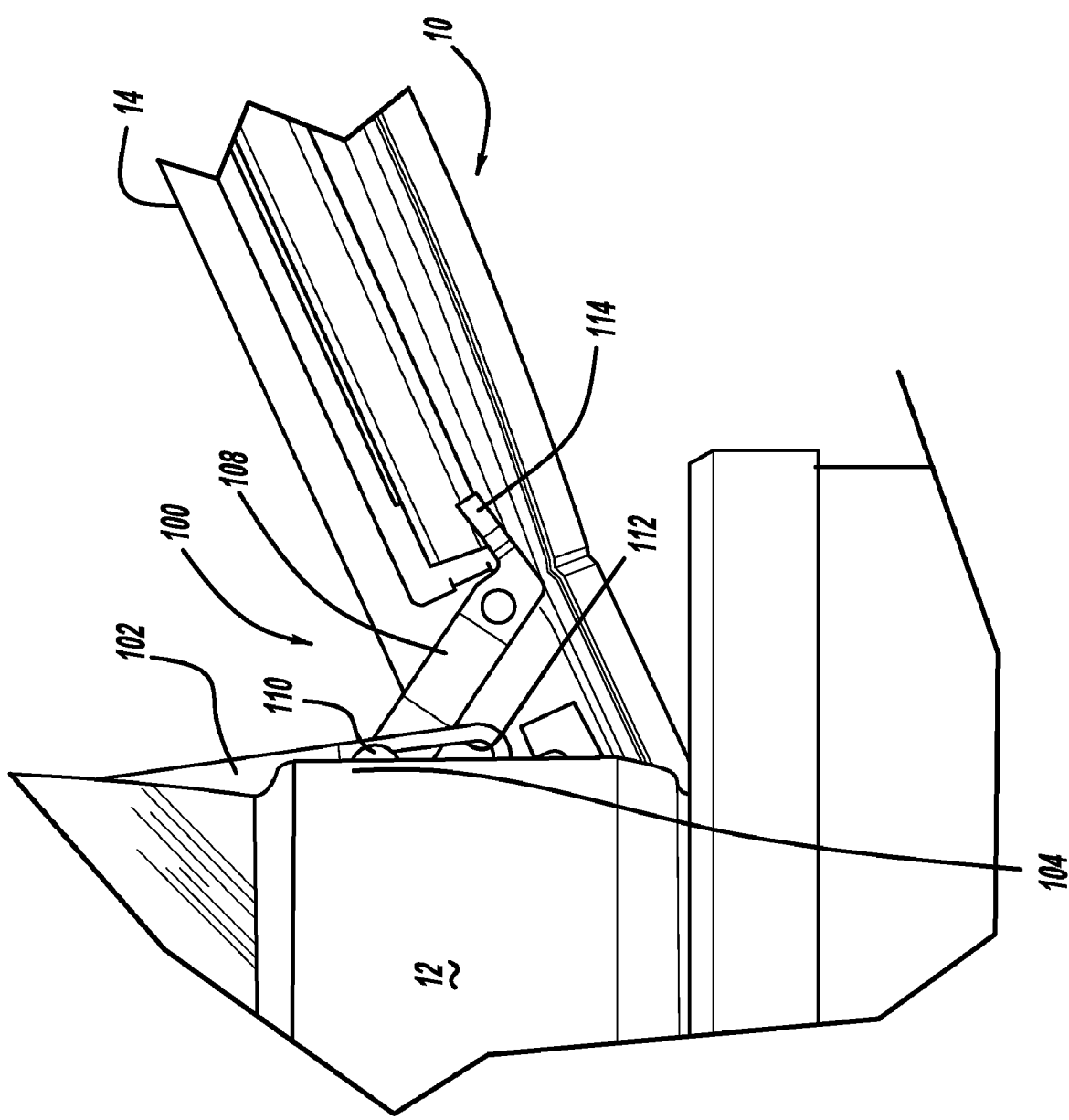
FIG. 6 is a side view of the lockout device of FIG. 4 with the side mounted tailgate step assist disposed in the retracted configuration of FIG. 2, and the tailgate pivoted upwardly to illustrate operation of the lockout device.
Figure 7:
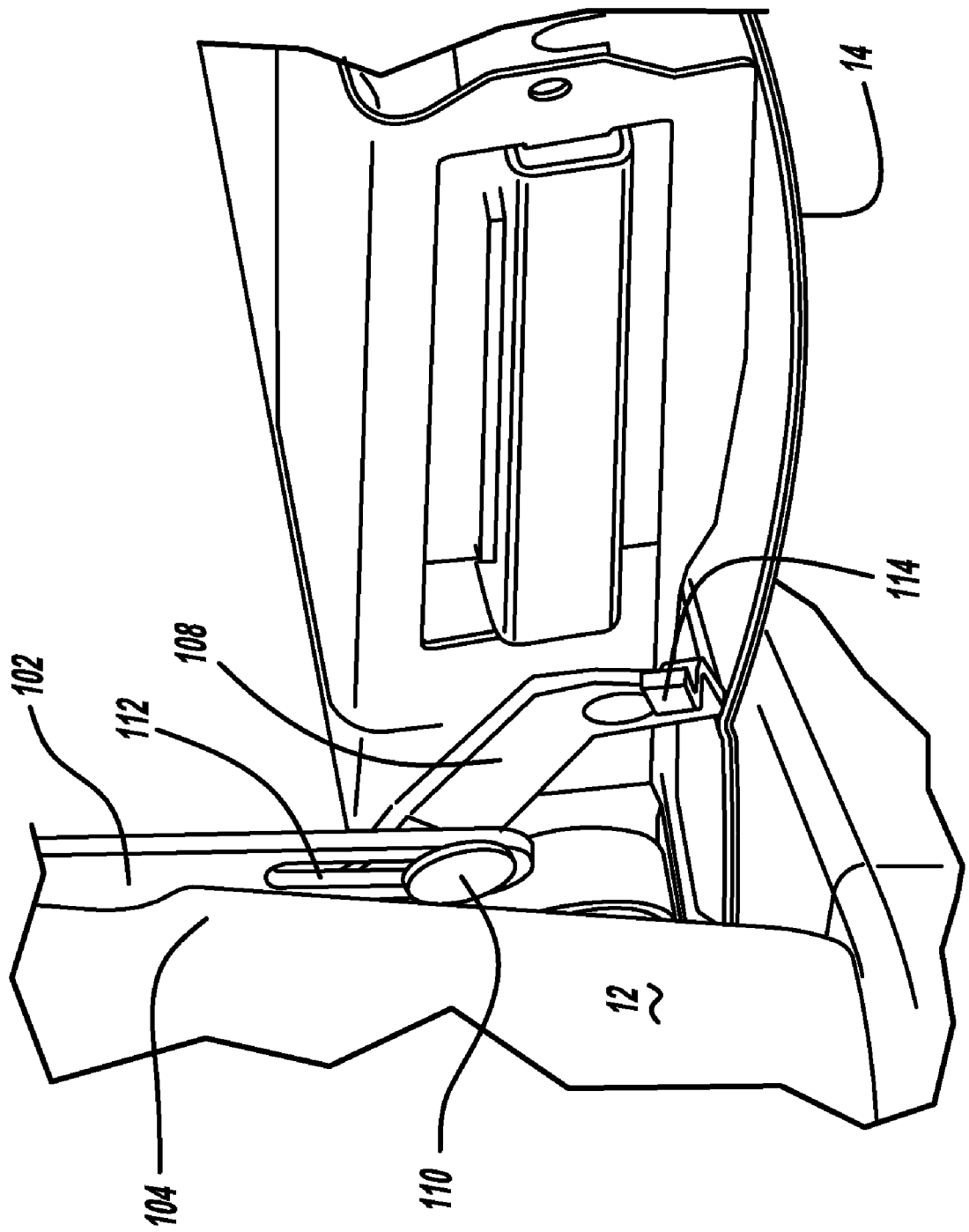
FIG. 7 is an isometric view of the lockout device of FIG. 4 with the side mounted tailgate step assist disposed in the retracted configuration of FIG. 2, and the tailgate disposed horizontally to illustrate operation of the lockout device.

In the intermediate and fully deployed configurations of FIGS. 9 and 10, in order to prevent inadvertent closing of tailgate 14 and thus damage to side mounted step assist mechanism 10 or the vehicle body, as shown in FIGS. 4-7, a lockout device 100 may be provided. As shown in FIG. 4, which illustrates step 20 in the fully deployed configuration, lockout device 100 may include a primary hinged link 102 pivotally mounted to D-pillar 104 and a secondary hinged link 108 slidably and pivotally disposed via pivot pin 110 in elongated slot 112 provided in link 102. Secondary hinged link 108 may include a generally L-shaped configuration with a stem 114 disposable under secondary guide channel 52 as shown in FIGS. 1, 4 and 5. Thus before step 20 is disposed in the deployed configurations of FIGS. 9 and 10, secondary hinged link 108, which is normally rotated upwards parallel to primary hinged link 102 and frictionally engaged therewith, may be pivoted downwards as shown in FIG. 7. With secondary hinged link 108 pivoted downwards, step 20 may be deployed as illustrated in FIGS. 9 and 10, and in this configuration, if tailgate 14 is rotated towards its closed position of FIG. 3, stem 114 slides upwardly via pivot pin 110 in slot 112 to form a rigid link, and in this configuration, stem 114 may further contact the bottom of secondary guide channel 52 to thus prevent tailgate 14 from being pivoted upwards more than approximately 25° as illustrated in FIGS. 4-6. Thus in the FIG. 7 initial deployed configuration, secondary hinged link 108 may be disposed at the bottom of elongated slot 112 and primary hinged link 102 may be disposed at an angle to the D-pillar (as opposed to its stowed position in which link 102 is disposed generally parallel to the D-pillar). As shown in FIG. 4, as tailgate 14 is pivoted upwardly with secondary hinged link 108 deployed, primary hinged link may again rotate to its original orientation parallel to the D-pillar to thus allow relative locking of secondary hinged link 108 and prevent further rotation of the tailgate.

Step lock and release mechanism 130 will now be described in detail with reference to FIGS. 1-3 and 8-11.

Specifically, referring to FIGS. 8-10, step lock and release mechanism 130 may be provided for maintaining step 20 in the retracted (i.e. stowed) configuration of FIG. 2 and permitting deployment of step 20 upon disengagement of mechanism 130. As shown FIGS. 8 and 11, mechanism 130 may generally include a lock tab 132 rotatably mounted to reinforcement beam 42 of step 20. Lock tab 132 may be rotatable upwardly or downwardly in the configuration of FIG. 8 to engage a separately mounted lock extension 134 (or alternatively mounting bracket 74 if lock extension 134 is omitted) to thus maintain step 20 in the retracted (i.e. stowed) configuration of FIG. 2.

The general operation of side mounted step assist mechanism 10 will now be described in detail with reference to FIGS. 1-11.

Specifically, referring to FIGS. 1-3, in order to operate mechanism 10 for loading or unloading of goods 18 that cover the rear (trailing edge) of tailgate 14, a user may first rotate tailgate 14 to its horizontal position of FIG. 2. At this stage, the user may disengage step lock and release mechanism 130 by rotating lock tab 132 to the disengaged position of FIG. 9, and simultaneously rotate secondary hinged link 108 downwards as shown in FIG. 7 to thus prevent inadvertent closing of tailgate 14 with step 20 deployed. The user may then pull step 20 out from cavity 22 of tailgate 14 to the positions of FIG. 9 and thereafter FIG. 10, and allow step 20 to pivot downwards from its weight as shown in FIG. 10. With step 20 fully deployed, the user may thus use step 20 to climb onto the side of tailgate 14 and into vehicle bed 16 to maneuver goods 18 as needed. Once finished maneuvering of goods 18, the user may simply follow the reverse sequence discussed above for exiting vehicle bed 16 and thereafter retracting step 20 to the position of FIG. 8.

To summarize, the invention thus allows a vehicle user to gain access to the truck cargo area via the open tailgate, even when loading of goods that might cover the rear (trailing edge) of the tailgate. In this regard, even if an object protrudes through the back of a truck bed, a user may climb into the truck bed from the sides of the tailgate, or alternatively, if two steps are provided, two users may climb onto the sides of the tailgate to assist with removal or placement of an oversized object from or into a truck bed. Referring to FIG. 1, in addition to step 20, users may support themselves when accessing the truck bed by utilizing a hand hold (not shown) molded within the D-pillar horizontal trim, or a pivotally mounted step assist arm.

Those skilled in the art would readily appreciate in view of this disclosure that various modifications could be made to the aforementioned components, without departing from the scope of the present invention. For example, instead of guide channels or rails 50, 52, 26, other slide assemblies may be used, as long as mechanism 10 is mounted on the side of a tailgate as discussed above. Further, instead of lockout device 100 or step lock and release mechanism 130, other mechanisms may be used for preventing inadvertent closing of the tailgate with step 20 deployed, or for releasing/locking step 20 in place as needed. Alternatively, more than one step, similar to tailgate step 20, may be disposed at predetermined locations between parallel supports 26.

Although particular embodiments have been described in detail herein with reference to the accompanying drawings, it is to be understood that the invention is not limited to those particular embodiments, and that various changes and modifications may be affected therein by one skilled in the art without departing from the scope or spirit of the invention as defined in the appended claims.

What is claimed is:

1. A vehicle tailgate side mounted step assist mechanism attachable to a vehicle including a vehicle bed coupled to at least one pillar and a tailgate pivotally attached to the vehicle bed for providing access to the vehicle bed in a tailgate open position and securing contents of the vehicle bed in a tailgate closed position, the tailgate having at least one side generally orthogonal to the pivotal attachment and capable of engaging a pillar when the tailgate is in the tailgate closed position, the mechanism comprising:

a slide assembly mountable along a side of the tailgate for deployment when the tailgate is in the tailgate open position, the slide assembly including a plurality of guide channels, generally parallel supports that communicate with the guide channels to extend away from and generally orthogonal to the side of the tailgate, a step rotation limit apparatus acting between the guide channels and the supports, and a tailgate step disposable between the supports at a predetermined distance from the side of the tailgate; and a lockout device disposable between the pillar and the side of the tailgate when the tailgate is in the tailgate open position, the lockout device capable of preventing the tailgate from returning to the tailgate closed position when the slide assembly is deployed, the lockout device further capable of stowing between the pillar and the tailgate when the tailgate is in the tailgate closed position, wherein the supports rotate generally about the side of the tailgate when the supports are extended and the step rotation limit apparatus restricts rotation of the tailgate step when the supports and tailgate step are in a deployed configuration.

2. A vehicle tailgate side mounted step assist mechanism according to claim 1, wherein the guide channels of the slide assembly include a primary guide channel that slidably engages a secondary guide channel which engages one of the generally parallel supports.

3. A vehicle tailgate side mounted step assist mechanism according to claim 2, further comprising at least one slot in one of the primary and secondary guide channels and at least one step positioning tab mounted to the other of the primary or secondary guide channels for engaging the slot and maintaining the primary and secondary guide channels in a predetermined position relative to each other.

4. A vehicle tailgate side mounted step assist mechanism according to claim 1, wherein the step rotation limit apparatus includes chamfered ends provided on the generally parallel supports for limiting rotation of the supports when the chamfered ends contact the guide channels.

5. A vehicle tailgate side mounted step assist mechanism according to claim 1, wherein the step rotation limit apparatus includes hooks disposed at ends of the generally parallel supports and openings disposed along the guide channels, the hooks capable of engaging the openings in the channels to limit rotation of the supports when the step assist mechanism is deployed.

6. A vehicle tailgate side mounted step assist mechanism according to claim 1, wherein the side of the tailgate includes a cavity for substantially stowing the generally parallel supports and the tailgate step.

7. A vehicle tailgate side mounted step assist mechanism according to claim 1, further comprising a step lock and release mechanism disposed along the side of the tailgate adjacent the slide assembly for maintaining the slide assembly in a stowed configuration and for selectively releasing the slide assembly to achieve a deployed configuration.

8. A vehicle tailgate side mounted step assist mechanism attachable to a vehicle including a vehicle bed coupled to at least one pillar and a tailgate pivotally attached to the vehicle bed for providing access to the vehicle bed in a tailgate open position and securing contents of the vehicle bed in a tailgate closed position, the tailgate having sides generally orthogonal to the pivotal attachment and capable of engaging a pillar when the tailgate is in the tailgate closed position, the mechanism comprising:
- at least two generally parallel supports rotatably mountable to a side of the tailgate, the supports capable of being deployed when the tailgate is in the tailgate open position and stowed when the tailgate is in the tailgate closed position;
- a tailgate step disposable between the supports at a predetermined distance from the side of the tailgate; and
- a lockout device which prevents the tailgate from returning to the tailgate closed position when the tailgate step is deployed;
- wherein the supports are rotatable generally about the side of the tailgate when the mechanism is mounted to the tailgate and the tailgate is in the tailgate open position to orient the tailgate step for a user of the vehicle bed.

9. A vehicle tailgate side mounted step assist mechanism according to claim 8, further comprising a primary guide channel that slidably engages a secondary guide channel which engages one of the generally parallel supports.

10. A vehicle tailgate side mounted step assist mechanism according to claim 9, further comprising at least one slot in one of the primary and secondary guide channels and at least one step positioning tab mounted to the other of the primary or secondary guide channels for engaging the slot and maintaining the primary and secondary guide channels in a predetermined position relative to each other.

11. A vehicle tailgate side mounted step assist mechanism according to claim 8, wherein the tailgate step between the generally parallel supports is pivotally attached to the supports and is capable of rotating and maintaining a generally horizontal step position when the mechanism is deployed for use.

12. A vehicle tailgate side mounted step assist mechanism according to claim 8, wherein the generally parallel supports include chamfered ends capable of limiting rotation of the supports when the ends substantially contact the channels.

13. A vehicle tailgate side mounted step assist mechanism according to claim 8, further comprising hooks disposed at ends of the generally parallel supports and guide channels in communication with the supports, the hooks capable of engaging openings in the guide channels to limit rotation of the supports when the step assist mechanism is deployed.

14. A vehicle tailgate side mounted step assist mechanism according to claim 8, further comprising a slide assembly disposed along one of the sides of the tailgate adjacent to a step lock and release mechanism, wherein the step lock and release mechanism is adapted to maintain the slide assembly in a stowed configuration and selectively release the slide assembly to achieve a deployed configuration.

15. A vehicle including a tailgate side mounted step assist mechanism, the vehicle comprising:
- a vehicle bed coupled to at least one pillar, a tailgate pivotally attached to the vehicle bed for providing access to the vehicle bed in a tailgate open position and securing contents of the vehicle bed in a tailgate closed position, the tailgate having sides generally orthogonal to the pivotal attachment and respectively capable of engaging a pillar when the tailgate is in the tailgate closed position;
- a slide assembly disposed along a side of the tailgate for deployment when the tailgate is in the tailgate open position, the slide assembly including a plurality of guide channels, generally parallel supports that communicate with the guide channels to extend away from and generally orthogonal to the side of the tailgate, a step rotation limit apparatus acting between the guide channels and the supports, and a tailgate step disposable between the supports at a predetermined distance from the side of the tailgate; and
- a lockout device which prevents the tailgate from returning to the tailgate closed position when the tailgate step is deployed;
- wherein the supports are rotatable when extended to orient the tailgate step for a user of the vehicle bed and the step rotation limit apparatus restricts rotation of the tailgate step when the supports and tailgate step are deployed.

16. A vehicle tailgate side mounted step assist mechanism according to claim 15, further comprising a step lock and release mechanism disposed along the side of the tailgate adjacent the slide assembly for maintaining the slide assembly in a stowed configuration and for selectively releasing the slide assembly to achieve a deployed configuration.

17. A vehicle tailgate side mounted step assist mechanism according to claim 15, wherein the guide channels of the slide assembly include a primary guide channel that slidably engages a secondary guide channel which engages one of the generally parallel supports.

18. A vehicle tailgate side mounted step assist mechanism according to claim 17, further comprising at least one slot in one of the primary and secondary guide channels and at least one step positioning tab mounted to the other of the primary or secondary guide channels for engaging the slot and maintaining the primary and secondary guide channels in a predetermined position relative to each other.

19. A vehicle tailgate side mounted step assist mechanism comprising:
two generally parallel supports rotatably mounted to a side of a tailgate, and capable of being deployed when the tailgate is open and stowed when the tailgate is closed;
a tailgate step disposed between the supports; and
a lockout device which prevents the tailgate from being closed when the tailgate step is deployed;
wherein the supports are rotatable to orient the tailgate step for a user.

* * * * *